May 2, 1967            F. A. RAYMOND            3,317,153
DIGITAL CONTROL SYSTEM FOR PRINTING PRESSES OR THE LIKE
Filed March 7, 1966            9 Sheets-Sheet 3
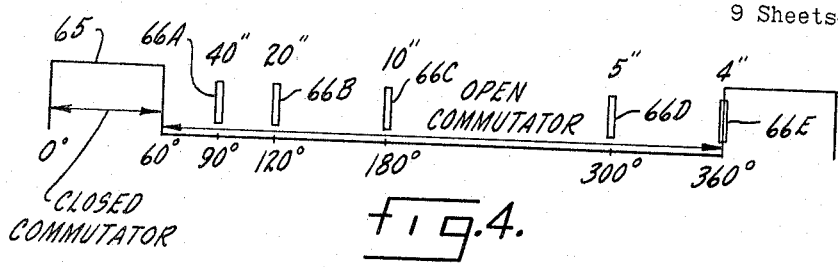
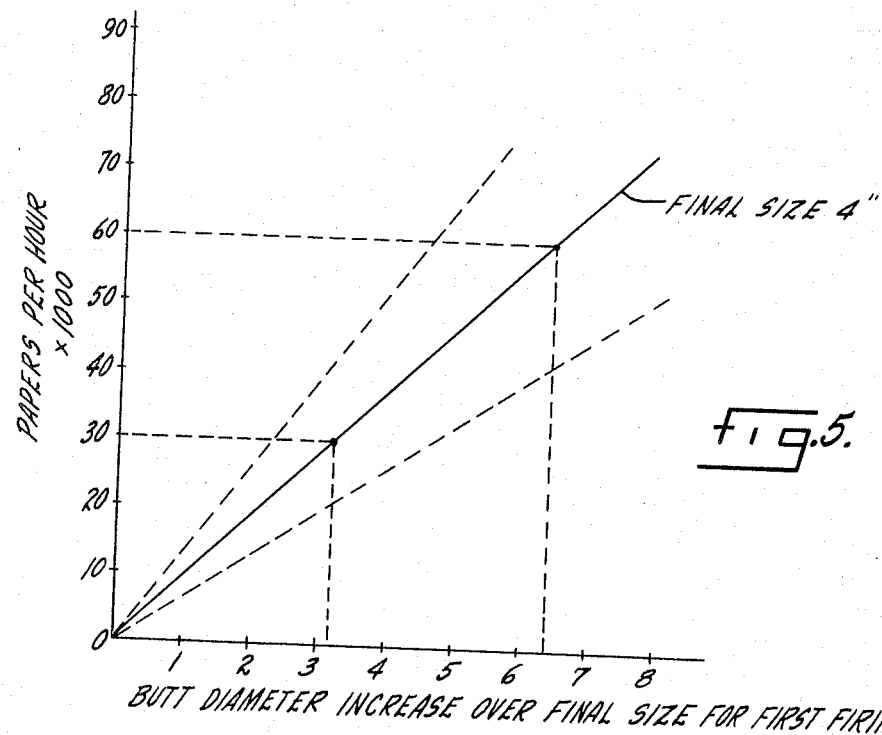
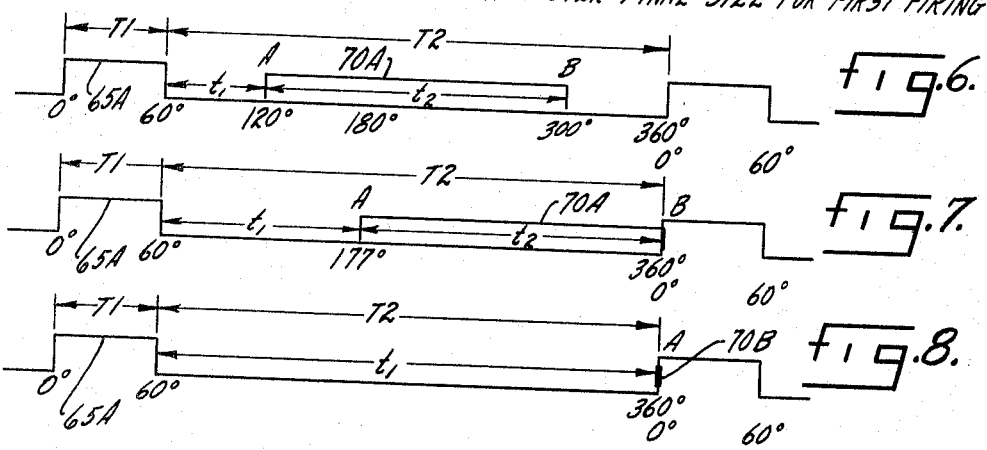
INVENTOR.
Francis A. Raymond,
BY Wolfe, Hubbard, Voit & Osann
Attorneys.

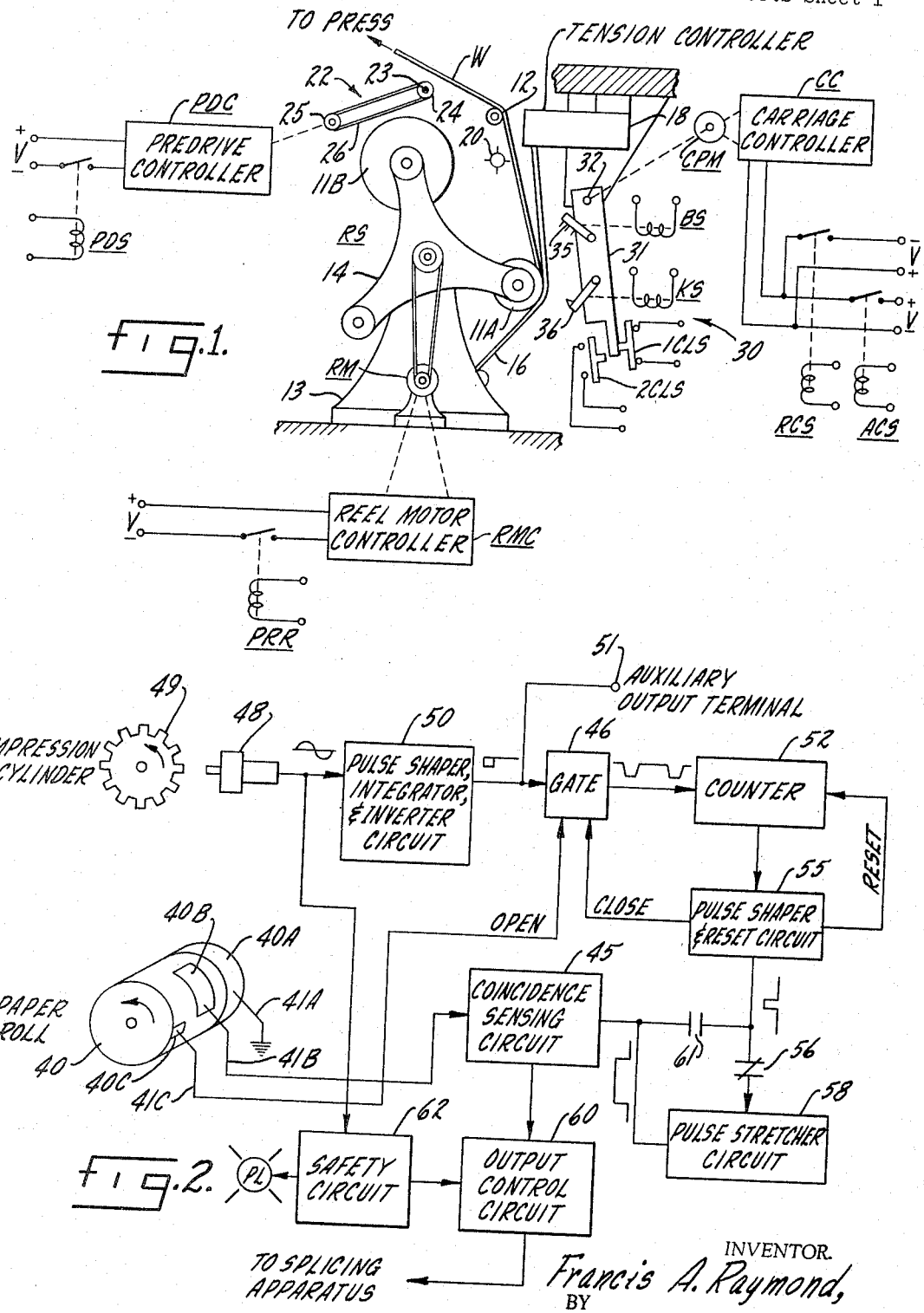

May 2, 1967
F. A. RAYMOND
3,317,153
DIGITAL CONTROL SYSTEM FOR PRINTING PRESSES OR THE LIKE
Filed March 7, 1966
9 Sheets-Sheet 4
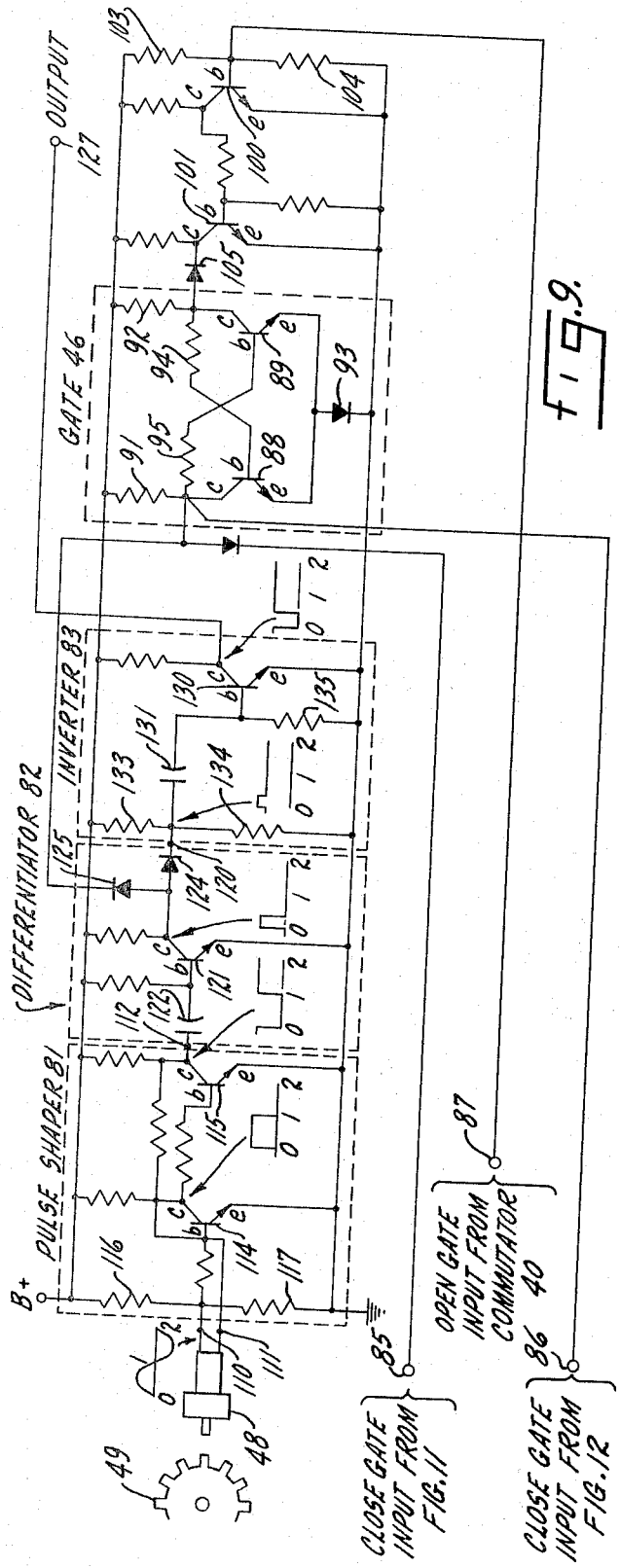
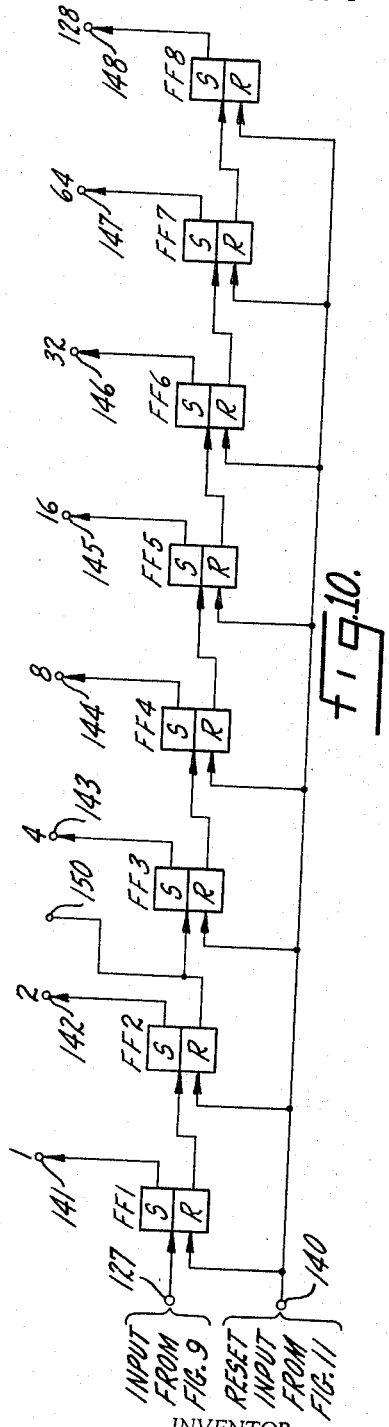
INVENTOR.
Francis A. Raymond,
BY
Wolfe, Hubbard, Voit & Osann
Attorneys.

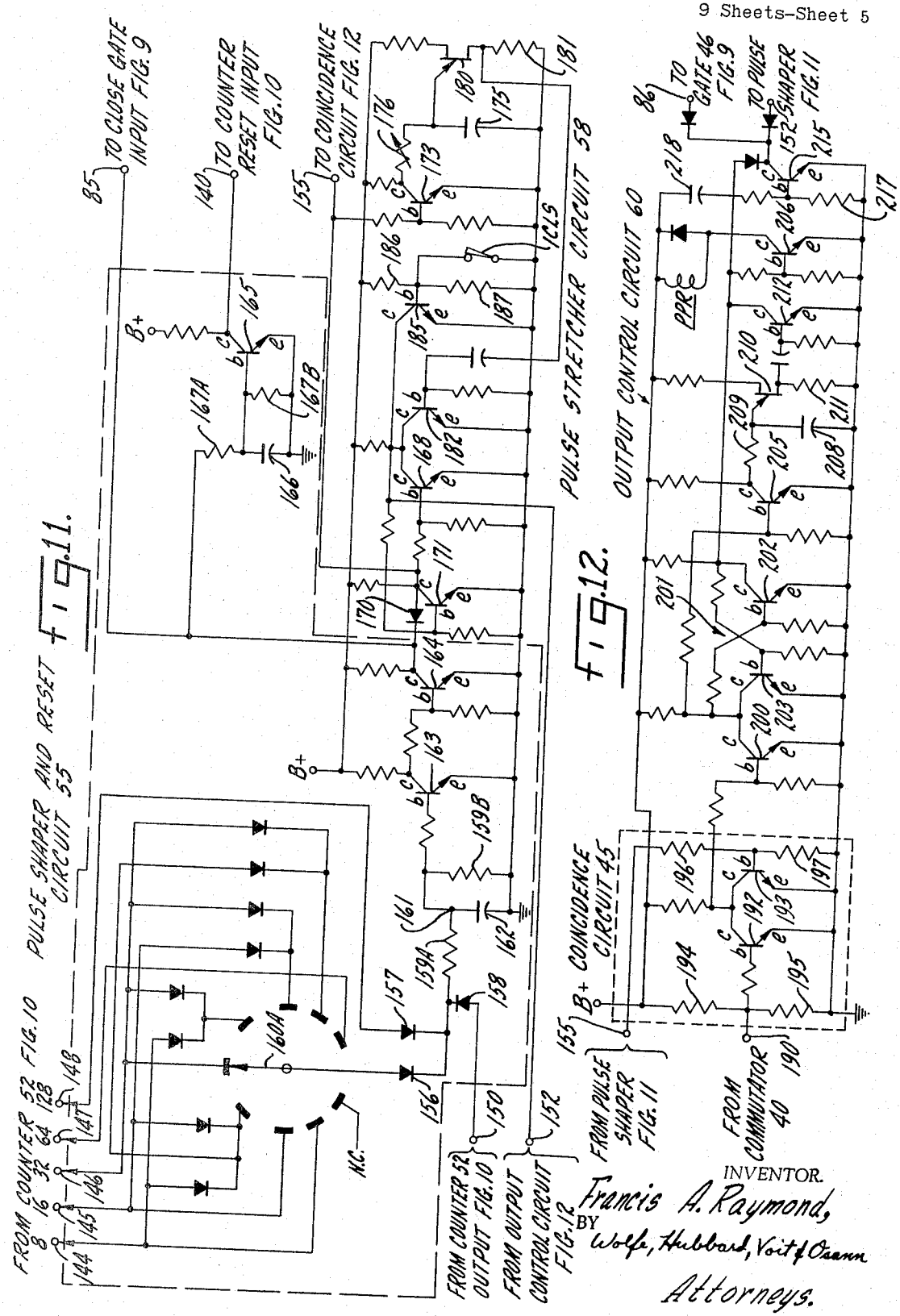

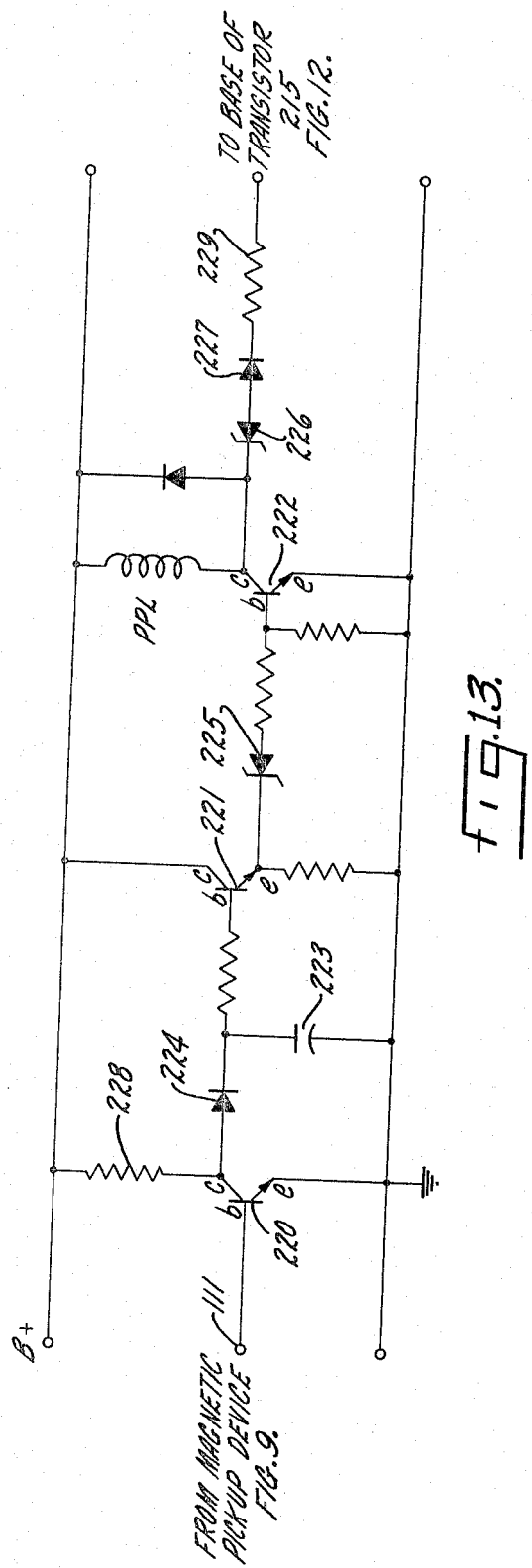

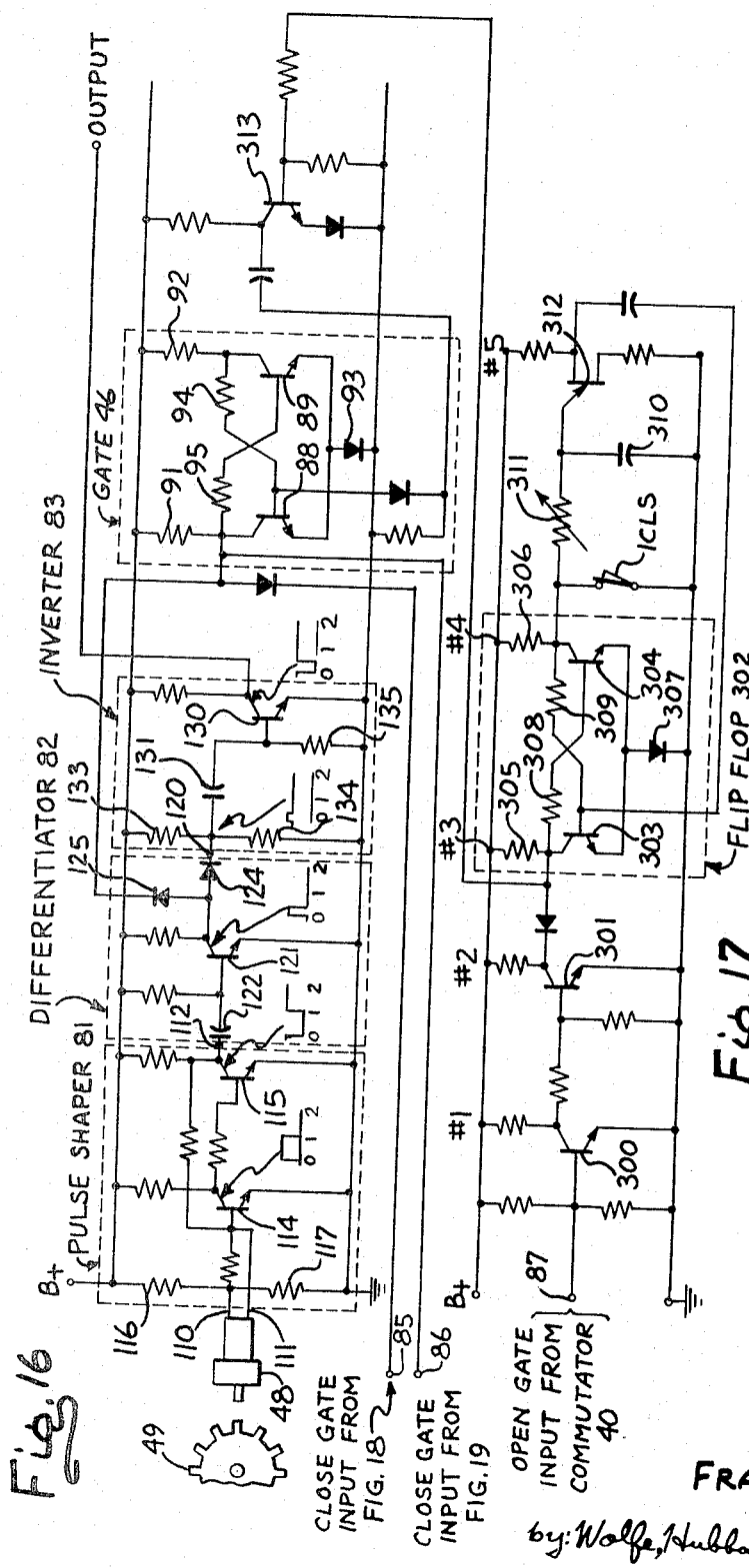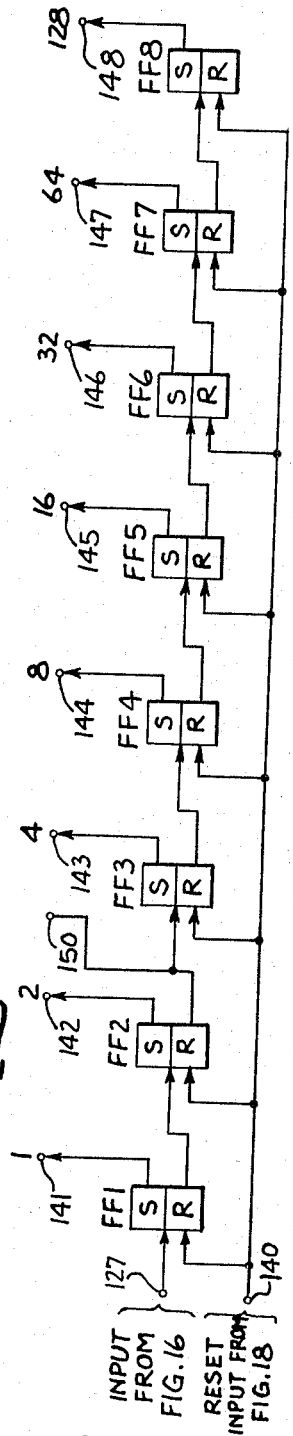

May 2, 1967

F. A. RAYMOND 3,317,153

DIGITAL CONTROL SYSTEM FOR PRINTING PRESSES OR THE LIKE

Filed March 7, 1966

INVENTOR
FRANCIS A. RAYMOND
by: Wolfe, Hubbard, Voit & Osann
ATTYS.

United States Patent Office 3,317,153
Patented May 2, 1967

3,317,153
DIGITAL CONTROL SYSTEM FOR PRINTING PRESSES OR THE LIKE
Francis A. Raymond, Westmont, Ill., assignor to Miehle-Goss-Dexter, Incorporated, Chicago, Ill., a corporation of Delaware
Filed Mar. 7, 1966, Ser. No. 538,439
19 Claims. (Cl. 242—58.3)

This application is a continuation-in-part of copending application Ser. No. 311,857, filed Sept. 26, 1963.

The present invention relates to a digital control system for web fed printing presses or the like and, more specifically, to a system for controlling the splicing of a new roll of material to the web of an expiring roll of material during operation of the press when the expiring roll has attained a specified diameter.

In a printing press of the type having a plurality of paper rolls on a reel, the web of paper normally is fed into the press from one roll of paper until the roll diameter approaches the diameter of the core around which the paper is wrapped. Paper from a second roll on the reel then is spliced to the paper from the expiring roll while the press is operating to maintain a continuous web feed to the press. In such operations, it is desirable that the entire operation, frequently referred to as making a paster, be automatically controlled so that a minimum amount of paper may remain on the core of the expiring roll at the completion of a splicing operation.

A general object of this invention is to provide an improved paster control system for use with a printing press or the like. In this connection, an object of this invention is to provide a reliable paster control system for controlling a web splicing operation which is fully automatic, completely eliminating any control duties of an operator or attendant.

Another object of this invention is to provide a paster control system for automatically splicing a new roll of material to the web of an expiring roll of material while the press is printing when the diameter of the expiring roll has attained a specified value. Coordinate with this object, an object of this invention is to provide a paster control system for automatically effecting the splicing operation at the instant the expiring roll attains the desired diameter for the particular speed at which the press or web-consuming device is operating. An additional object of this invention is to provide a paster control system of this type which is a pure digital system and which is not dependent upon variations in voltage or the like.

A further object of this invention is to provide a paster control system for automatically initiating preliminary operations, such as positioning the new roll, lowering predrive and paster carriages, and rotating the new roll at a desired speed a time interval before the actual splicing must take place wherein the time interval is dependent upon the speed at which the press or web-consuming device is operating, thereby assuring sufficient time for completion of such preliminary operations. Accordingly, an object of this invention is to provide a paster control system for automatically initiating the preliminary operations and the actual splicing operations in sequence, both properly timed in relation to the gradually diminishing diameter of the expiring roll.

Still another object of this invention is to provide an improved and reliable system for continuously monitoring the diameter of a roll of material upon which or from which material is being wound or unwound, even though the linear velocity at which the material is travelling is varied over a wide range.

A general object of this invention is to provide an improved paster control system which is characterized in its uniformity, its efficiency, its reliability and its economy of operation.

Other objects and advantages of this invention will become apparent upon reading the attached detailed description and upon reference to the drawings, in which:

FIGURE 1 is a schematic illustration of a web-splicing apparatus;

FIG. 2 is a block diagram of a control circuit constructed in accordance with the present invention for controlling the splicing apparatus illustrated in FIG. 1;

FIG. 4 is a wave form illustrating the angular relationship between signals representative of the passage of a predetermined length of web and the closure of a commutator associated with the running web in FIG. 1;

FIG. 5 is a graph illustrating the relationship between papers per hour for a newspaper printing operation and the increase in butt diameter of the expiring roll over the desired final butt size when preliminary splicing operations are to be initiated;

FIG. 6 is a diagram which illustrates the relationship between wave forms of the pulses produced by the apparatus shown in FIG. 2, 65A being the reference pulse indicative of commutator closure and 70A being a stretched control pulse at a time when the new roll is large;

FIG. 7 is a diagram which illustrates the relationship of the wave forms when the reference pulse first coincides with the stretched control pulse to produce a first signal to the output control circuit which originates preliminary operations in paster cycle;

FIG. 8 is a diagram which illustrates relationships of wave forms after preliminary operations have taken place and the nonstretched control pulse coincides with the reference pulse which actuates the coincidence sensing circuit thus allowing the pulse to reach the output control circuit and "fire" the final splicing operation;

FIG. 9 is a detailed schematic diagram of a pulse shaper, integrator, and inverter circuit and a gate illustrated in block form in FIG. 2;

FIG. 10 is a symbolic schematic diagram of a counter illustrated in block form in FIG. 2;

FIG. 11 is a detailed schematic diagram of a pulse shaper and reset circuit and pulse stretcher circuit illustrated in block form in FIG. 2;

FIG. 12 is a detailed schematic diagram of a coincidence sensing circuit and an output control circuit illustrated in block form in FIG. 2;

FIG. 13 is a detailed schematic diagram of a safety circuit illustrated in block form in FIG. 2;

FIG. 16 is a schematic diagram of a circuit similar to FIG. 9 modified to include a counter delay circuit;

FIG. 17 is a symbolic schematic diagram of a counter for use with the circuit of FIG. 16;

FIG. 18 is a schematic diagram of a pulse shaper and reset circuit for use with the circuit of FIG. 16; and FIG. 19 is a schematic diagram of a coincidence sensing circuit and an output control circuit for use with the circuit of FIG. 16.

Figure 3:
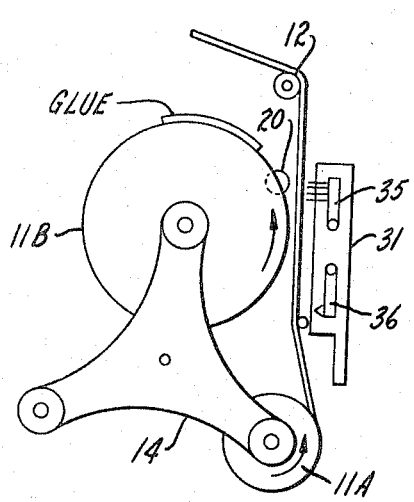
FIG. 3 is an exploded view of a portion of the apparatus illustrated in FIG. 1 shown at a time when a splicing operation is to take place.

While the invention will be described in connection with certain preferred embodiments, it is to be understood that the invention is not to be limited to the particular embodiments disclosed but, on the contrary, it is intended to cover the various modifications and equivalent arrangements included within the spirit and scope of the appended claims.

In certain drawings, flip-flops have been symbolically illustrated since they are commonly used in the electronics art. However, a brief description of their operation may be helpful in understanding the operation of the digital control system of this invention. The flip-flops are illustrated as rectangles having two sections, one being marked S and the other being marked R. Input terminals are attached to the left-hand side of the flip-flops, as illustrated, and output terminals are attached to the right-hand side thereof. When an input signal or pulse is applied to the S input terminal, the flip-flop is "set" and a desired output signal is provided at the S output terminal only. When an input signal or pulse is applied to the R input terminal, the flip-flop is "reset" and a desired output signal is provided at the R output terminal only. When an input signal or pulse is applied to a terminal connected to the junction of the S and R sections, the flip-flop is "set" in response to each odd-numbered input pulse and is "reset" in response to each even-numberd input pulse, a desired output signal being provided at the S output terminal upon setting and at the R output terminal upon resetting of the flip-flop.

Additionally, in certain drawings transistors have been schematically illustrated which have bases, emitters, and collectors respectively designated as b, e and c. More specifically, the transistors have been illustrated as being of the NPN type having grounded emitters so that a transistor is rendered conductive when the base is driven positive with respect to the emitter and is rendered nonconductive when the base is driven negative with respect to the emitter or is grounded.

*The environment for the control system*

Referring now to the drawings and more specifically to FIG. 1, the invention has been illustrated by way of example as employed in web-splicing apparatus for use with a newspaper printing press. In order that the invention may be fully understood, it will be helpful to set forth an environment in which it may be employed. The apparatus shown herein for setting forth the background is of the type diclosed in U.S. Patent 2,963,235, issued Dec. 6, 1960, to A. V. Pedersen et al. and in U.S. Patent 2,963,234, issued Dec. 6, 1960, to C. W. Chase et al., though the invention may be adapted by those skilled in the art to cooperate with various physical forms of splicing apparatus.

In general terms, a printing press (not illustrated) as powered by variable speed drive means such as an electric motor controlled by a suitable speed controller. By manually setting the controller, the speed of the press may be adjusted to any value within a wide range. Turning now to FIG. 1, the press consumes a web W of paper which is drawn upwardly from an expiring roll 11A and passes over a guide roller 12, the press and related machinery being omitted from the present illustration. It will be apparent, nevertheless, that the linear velocity of the running web W depends upon the speed of the press as determined by the setting of the speed adjusting means associated therewith.

A reel stand RS is provided for supporting the expiring roll 11A and a new roll 11B. The reel stand includes a frame structure 13 and a rotatable spider assembly 14 having three uniformly distributed reel spindles. In the illustrated example, the expiring roll 11A is mounted on one spindle, the new roll 1B is mounted on a second spindle, and the third spindle is illustrated as being vacant.

In order to create tension in the web W and to insure its smooth passage upwardly into the press, an automatic tensioning system is provided to oppose the rotation of the expiring roll 11A. Briefly, the automatic tensioning system includes stationary friction straps 16 which engage the periphery of the expiring roll and are spaced apart over the axial length of the expiring roll 11A. The straps are anchored to the frame structure 13 of the reel stand and are kept taut by means of a pneumatic tension controller 18. The tension applied to the straps varies in accordance with the position of a floating guide roller (not shown), such position varying when the tension on the web W increases or decreases. Since the control of the web tension is conventional, and since such control does not constitute a part of the present invention, the automatic running tensioning system will not be described in further detail.

When the expiring roll 11A is about to expire, the leading end of the web on the new roll 11B is spliced to the running web without slowing down the speed of the web running into the printing press. For the leading end of the web on the new roll 11B to be spliced to the running web W, the new roll 11B must be moved to a position in which its periphery is adjacent the running web W and, subsequent to the splicing operation, the new roll 11B must be moved approximately to the position in which the expiring roll 11A is illustrated in FIG. 1 so as to engage the friction straps 16. For the purpose of moving the new roll 11B to successive positions, a reel motor RM, which is controlled by a reel motor controller RMC, is provided for rotating the spider assembly 14. The reel motor controller RMC in turn is controlled by operation of a position reel relay PRR which controls the supply of power to the reel motor controller, the controlled operation of the position reel relay PRR being set forth later in the description.

In order to determine accurately and automatically when the new roll 11B has been translated to a position closely adjacent the running web W, a photoelectric device 20 may be mounted adjacent the running web W and associated with a light beam source so that the light beam will be broken by the periphery of the new roll 11B and the photoelectric device 20 will be deactuated when the new roll has been driven to the desired position.

For the purpose of predriving or rotating the new roll 11B prior to the splicing operation in order that its peripheral speed will substantially match the linear velocity of the running web so that the web on the new roll is not severed when splicing occurs, predriving means are associated with the new roll 11B. Besides operating to predrive the new roll 11B, the predriving means are also employed in the present instance to retard the new roll immediately after a splicing operation so that tension is applied to the web running into the press during the transition period required for the new roll to be advanced into engagement with the friction straps 16. As illustrated, the predriving means include a predrive carriage 22 which is pivoted to swing about a shaft 23 between a raised or "stowed" position clear of the path of movement of the rolls supported by the reel stand RS and a lowered or "operative" position in which it is in operative contact with the new roll 11B. The carriage 22 journals pulleys 24 and 25 on either end over which is trained an endless predriving belt 26. When the carriage 22 is lowered to the operative position, the belt 26 engages the surface of the new roll 11B and, if the belt 26 is either driven or braked, it will serve to apply a driving or braking torque to the new roll 11B. For this latter purpose, the pulley 24 is drivingly connected with a predrive and braking motor (not illustrated) which is energized in a desired manner to properly control either its driving speed or its regenerative braking torque, the details thereof being set forth in the above-mentioned Pedersen et al. and Chase et al. patents.

In order to move or shift the predrive carriage 22 between its "stowed" and "operative" positions, a predrive controller PDC is provided. When rendered operative, the predrive controller PDC will either cause the carriage 22 to be swung counterclockwise or clockwise depending on whether the belt 26 is to be moved into engagement with the new roll or is to be moved out of engagement therewith. Operation of the predrive controller PDC is controlled by a predrive solenoid PDS which causes power to be applied to the predrive controller when energized, the controlled operation of the predrive solenoid PDS being set forth later in the description.

Once the new roll 11B has been moved to a position adjacent the running web W by rotation of the spider assembly 14 and the new roll 11B is predriven so that its peripheral speed substantially matches the linear velocity of the running web W, the actual splicing of the leading end of new web to the running web W is accomplished by the deflecting of the running web against the surface of the new roll. It will be understood that a pattern of glue or other adhesive material is previously applied on the leading end of the new roll web, the adhesive pattern having axial discontinuities in the regions where the predrive belt 26 engages the new roll surface. The deflection of the running web W against the new roll web causes the leading end of the new roll web to adhere to the running web W and start travelling into the press.

For deflecting and then severing the running web W, a paster assembly 30 is provided which includes a carriage 31 pivotally supported on a shaft 32 to swing between a retracted or "stowed" position clear of the path of movement of the reel supported web rolls and a lowered or "operative" position adjacent the running web W on the opposite side thereof from the new roll 11B. For the purpose of driving the carriage 31 between the "stowed" and "operative" positions, a carriage positioning motor CPM is provided which is controlled by operation of a carriage controller CC. The carriage controller CC is in turn controlled by operation of an advance carriage solenoid ACS and a return carriage solenoid RCS which cause opposite polarity inputs to be applied thereto when energized. When the advance carriage solenoid ACS is energized, the carriage 31 will be advanced to the "operative" position and, when the return carriage solenoid RCS is energized, the carriage 31 will be returned to the "stowed" position. Moving the paster carriage 30 into position, plus positioning and predriving the new roll, are known as preliminary operations.

Supported by the carriage 31 is a brush assembly including a pivoted brush 35 for deflecting the running web W against the periphery of the new roll 11B in order that the adhesive on the leading end of the new roll web will adhere to the running web. For the purpose of moving the brush 35 into engagement with the running web W so as to impart deflecting movement thereto, a brush solenoid BS is provided which when energized imparts such movement to the brush 35. A knife assembly including a pivoted cutter or knife 36 is also provided on the carriage 31 for severing the old web drawn from the expiring roll 11A immediately after the brush assembly 35 has deflected the web against the glue pattern on the new roll 11B. For the purpose of moving the knife assembly 36 into severing engagement with the old running web, a knife solenoid KS is provided which imparts such movement thereto when energized.

For sensing the position of the carriage 31, a first carriage limit switch 1CLS is mounted such that its actuator will be depressed and associated contacts will be closed by the carriage when the carriage is in "stowed" position. A second carriage limit switch 2CLS is mounted such that its actuator will be depressed and associated contacts will be closed by the carriage when the carriage is in the "operative" position.

The controlled operations of the advance carriage solenoid ACS, the return carriage solenoid RCS, the brush solenoid BS and the knife solenoid KS will become apparent later in the description.

*Digital control system*

In accordance with the present invention, digital control means are provided which include pulse operating means for producing a pair of spaced pulses during each revolution of the expiring roll, the time relationship between said pulses varying as a function of the expiring roll diameter and the press speed, and sensing means operatively connected to the pulse generating means and responsive to prescribed time relationships between the pulses for producing an output signal to initiate the preliminary operations and the actual splicing operations in sequence in a properly timed relationship with the gradually diminishing diameter of the expiring roll. Thus, the preliminary operations of rotating the spider assembly 14 to position the new roll adjacent the running web from the expiring roll, lowering the predrive and paster carriages 22 and 31, and predriving the new roll are all initiated and carried out sequentially when the expiring roll reaches a first diameter, which at the then-existing press speed leaves sufficient time for the preliminary operations to be completed before the actual splicing of the webs must take place. Further, the actual splicing operation which includes deflecting the running web against the new roll and severing the expiring roll is initiated and the operations therein are carried out sequentially when the expiring roll reaches a second, smaller, predetermined diameter indicative of the fact that substantially all of the web on the expiring roll has been used up.

In order to determine when the expiring roll 11A has reached such first and second diameters in the illustrative embodiment of FIGURES 2 through 14, there are provided pulse generating means for producing a reference pulse during a portion of each revolution of the expiring roll, web measuring means operable in each revolution of the expiring roll to measure the length of web fed from the expiring roll and to produce a control pulse when a predetermined length has been measured, and sensing means connected to receive the pulses and being responsive to a prescribed time relationship between the reference and control pulses to produce an output signal. Thus, means are provided for producing a reference pulse during each revolution of the expiring roll which is dependent upon the angular velocity of the expiring roll, and for comparing the time relationship between the occurrence of a control pulse and a reference pulse. It should be noted that the angular velocity of the expiring roll depends upon two things, i.e., the linear velocity of the running web (press speed) and the diameter of the expiring roll.

The preliminary operations of positioning the carriages and predriving the new roll always require approximately the same amount of time for the same surrounding conditions, e.g., the same new roll size, but the faster the web speed, the greater is the rate of decrease in diameter of the expiring roll. Consequently, the preliminary operations should be initiated when the expiring roll has a diameter which is at least approximately proportional to the adjusted web velocity or press speed. This means that by the time the preliminary operations are completed, the expiring roll has almost reached a predescribed diameter. To so initiate the preliminary operations when the expiring roll has a diameter related to the adjusted press speed, two signals varying as functions of the angular roll velocity and linear web velocity are generated, compared, and utilized to initiate the preliminary operations when the signals timingly overlap, i.e., portions thereof timingly coincide.

After the preliminary operations are completed, the actual splicing is triggered when the expiring roll has been reduced to a predetermined diameter which remains at the preset value regardless of the adjusted value of the press speed. This is accomplished by the same signal generating apparatus mentioned above, but with one of the signal generating means being modified. Thus, two signals are again utilized to trigger the actual splicing operation when the signals timingly overlap.

Referring now to FIG. 2, a control system is illustrated for initiating the preliminary operations and the splicing operations. For the purpose of producing a reference pulse during each revolution of the expiring roll, a commutator 40 is provided which is associated with the expiring roll, roll 11A as illustrated in FIG. 1. In the exemplary embodiment of the control system, the commutator 40 is so designed that (1) a reference pulse having a time period corresponding to a 60° sweep is provided during each 360° revolution of the commutator and the expiring roll and (2) a triggering pulse is provided at the termination of the 60° reference pulse sweep. For this purpose, three contact portions 40A–40C are provided on the commutator 40 which are engaged by brushes 41A–41C. Contact portion 40A is provided around the entire circumference of the commutator 40, contact portion 40B is provided over a 60° portion of the circumference, and contact portion 40C is provided over a short portion of the circumference adjacent the termination of the contact portion 40B. Since the brush 41A is connected to ground, a ground signal will be provided at brush 41B during each 60° sweep of the commutator 40 when the brush 41B is in engagement with the contact portion 40B and a ground signal will be provided at brush 41C when brush 41C engages the contact portion 40C. For this example, the beginning of contact portion 40B is arbitrarily designated as the 0° or 360° point in the circumference of the commutator 40.

The ground signal provided at the brush 41B, i.e., the reference pulse, is transmitted to a coincidence sensing circuit 45 for a purpose to be described hereinafter and the ground signal provided at the brush 41C, i.e., the triggering pulse, is transmitted to a gate 46 so that the gate is opened and pulses may be transmitted therethrough. Accordingly, the reference pulse is produced between 0° and 60° of each commutator revolution and the triggering pulse is produced at 60°, i.e., the commutator is closed 60° and open 300° during each 360° revolution.

Though the means for producing the reference pulse and for producing the triggering signal is illustrated as a commutator associated with the expiring roll 11A, it is to be understood that any desired device may be utilized for producing the reference pulse and the triggering signal and the present invention is intended to cover all such devices.

The control system is designed to produce a reference pulse only during 60° of each 360° sweep of the commutator so that the brush solenoid BS in FIG. 1 can only be energized when the glue pattern on the new roll 11B is in the position illustrated in FIG. 3. As will be obvious to one skilled in the art, the new roll may be severed or torn if the solenoid BS is energized before the glue pattern is in contact with the expiring roll web.

Figure 15:
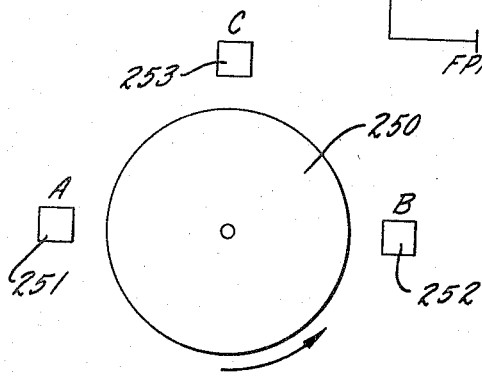
FIG. 15 is a diagram which illustrates a second embodiment of control pulse producing means which may be substituted in the control system shown in FIG. 2.

One means for producing control pulses at a rate dependent upon the speed of the running web W includes a magnetic pickup device 48 and a gear 49 mounted on the shaft of an impression cylinder (not shown) so that pulses are produced when paper is being printed. However, it is to be understood that any desired means may be utilized for producing control pulses which fall within the scope of the invention. One alternate form is shown in FIG. 15 and will be described later. The magnetic pickup device 48 and the gear 49 are so associated that, as the gear rotates, the teeth thereof induce pulses in the magnetic pickup device which provides an A.-C. output, one A.-C. output cycle being provided for each pulse induced therein. In one example, the gear 49 has thirty-two teeth equally spaced around the circumference thereof so that, for every tooth passing by the magnetic pickup, $\frac{1}{32}\pi \times \frac{5}{6}$ inches of web will have passed to the press, $\frac{5}{6}$ being used as a reference length to correspond to the 300° or $\frac{5}{6}$ sweep of the commutator 40 when no reference pulse is provided thereby.

The A.-C. output of the magnetic pickup device 48 is transmitted to a pulse shaper, integrator, and inverter circuit 50 which produces a pulse type output for each cycle of the A.-C. magnetic pickup device output. The output pulses in turn are transmitted to the input of the gate 46 which, when opened, allows the pulses to pass therethrough to the input of a counter 52. As previously mentioned hereinabove, the gate 46 is opened when a triggering pulse is produced in the brush 41C associated with the commutator 40. The output of the pulse shaper, integrator, and inverter circuit 50 is also associated with an auxiliary output terminal 51, for a purpose to be discussed later.

The counter 52 is preferably a binary scaler having eight stages which is preset to produce an output when a selected number of pulses have been counted thereby. Since, when the gate 46 is open, one pulse is applied to the counter 52 for each cycle of the A.-C. magnetic pickup device output, the count in the counter 52 corresponds to the number of teeth of the gear 49 which have passed the magnetic pickup device 48. Thus, when an output pulse is produced by the counter 52, it indicates that a prescribed reference length of the running web W has passed through the press. For example, if the counter 52 is set to produce an output when one hundred and twenty-eight pulses have been counted thereby, 10.47 inches of webbing will have passed to the press since, as previously mentioned, the passage of each tooth indicates the passage of $\frac{1}{32}\pi \times \frac{5}{6}$ inches of paper and $\frac{128}{32}\pi \times \frac{5}{6} = 10.47$ inches. This corresponds to $\frac{5}{6}$ of the circumference of a roll having a four-inch diameter. It will be apparent that, by changing the preset count for counter 52 in one-count steps, the reference length of running web may be changed in steps of $\frac{1}{32}\pi \times \frac{5}{6}$ inches.

The output of the counter 52 is transmitted to a pulse shaper and reset circuit 55 which, in response thereto, produces a reset pulse which is transmitted to the counter 52 to cause resetting thereof and produces a gate closing pulse which is transmitted to the gate 46 to cause closing thereof. Additionally, an output pulse or "control" pulse is produced by the pulse shaper and reset circuit 55 which is transmitted through a normally closed contact 56 to a pulse stretcher circuit 58 which in turn produces an output pulse having a preselected extended time period, i.e., a "stretched" pulse. The output of the pulse stretcher circuit is in turn transmitted to the coincidence sensing circuit 45. The pulse stretcher circuit 48 is preset to produce a "stretched" pulse having a constant time period regardless of the linear velocity of the running web W.

When the reference pulse produced by the commutator 40 and the "stretched" pulse produced by the pulse stretcher circuit 58 timingly overlap, the coincidence sensing circuit 45 is rendered operative to provide an output pulse which is transmitted to an output control circuit 60. In response to the coincidence sensing circuit output, the output control circuit 60 operates to initiate the previously described preliminary operations of the splicing apparatus illustrated in FIG. 1. Additionally, the output control circuit 60 operates to open the normally closed contact 56 and to close the normally open contact 61 so that the output of the pulse shaper and reset circuit 55 is no longer connected through the pulse stretcher circuit 58 to the coincidence sensing circuit 45, but rather is connected directly to the input of the coincidence sensing circuit 45, i.e., the pulse stretcher circuit is rendered ineffective. Subsequently, when the reference pulse produced by the commutator 40 and the control pulse produced by the pulse shaper and reset circuit 55 timingly overlap, the coincidence sensing circuit 45 is rendered operative to produce an output pulse which is transmitted to the output control circuit 60. In response to this coincidence sensing circuit output pulse, the output control circuit 60 operates to initiate the splicing operation of the apparatus illustrated in FIG. 1. It should be noted that the time of coincidence as well as the reference length of web W may be changed by changing the preset count in counter 52.

For the purpose of insuring against false operation of the control system when the expiring roll is manually displaced during a "jogging" operation, a safety circuit 62 is provided for rendering the control system inoperative when the press is not running. Additionally, the safety circuit 62 controls operation of a paster pilot indicating light PL.

From the foregoing, it may be seen that a control system has been provided for initiating the preliminary operations and the splicing operations of the apparatus illustrated in FIG. 1. However, it may be helpful in more thoroughly understanding the invention to set forth in more detail the timed relationships between the output pulses provided by the commutator 40, the pulse shaper and reset circuit 55, and the pulse stretcher circuit 58.

Referring to FIG. 4, a wave form 65 is shown which depicts the output at brush 41B associated with the commutator and illustrates that the commutator 40 is closed from 0° to 60° during each revolution of the expiring roll 11A to produce a ground reference pulse at the brush 41B having a time period corresponding to a 60° sweep of the commutator and is opened from 60° to 360° during each revolution so that no reference pulse is produced during this portion. Additionally, a plurality of pulses 66A-66E are illustrated in FIG. 4 which represent control pulses produced at the output of the pulse shaper and reset circuit 55 when the expiring roll 11A has prescribed diameters, the diameters being set forth in inches above each of the control pulses. As previously mentioned, the contact portion 40C on the commutator 40 is positioned adjacent the end of the contact portion 40B corresponding to the 60° point along the commutator circumference. Accordingly, the triggering pulse produced at the brush 41C occurs timingly adjacent the termination of the reference pulse produced at the brush 41B so that the gate 46 is opened timingly adjacent the termination of the reference pulse. From this, it may be seen that pulses are permitted to pass to the counter 52 during the 300° sweep of the commutator and the expiring roll 11A subsequent to the production of the reference pulse until gate 46 is closed.

The control system is so designed that the counter 52 is filled causing an output pulse to be produced by the pulse shaper and reset circuit 55 during the time interval between the production of successive reference pulses by the commutator 40, i.e., during the 300° sweep of the commutator and expiring roll when the commutator is open. The precise angle at which the counter 52 is filled and a control pulse is produced by the pulse shaper and reset circuit 55, when it is assumed that the commutator 40 is closed at 0° and is opened at 60°, may be computed by solving the following equation:

$$\phi = (t_2/t_1 \times 300) + 60$$

wherein $\phi$ equals the angle at which the control pulse is provided; $t_1$ equals the time for a 300° rotation of the expiring roll 11A; and $t_2$ equals the time for a reference length of web to pass through the press. The reference length is equal to the 300° portion of the circumference of the expiring roll 11A when the expiring roll has the desired final "butt" diameter, i.e., the press reference length equals $\frac{5}{6}\pi D$, wherein D is the final "butt" diameter.

The angle at which the control pulse occurs may also be computed by solving the following equation:

$$\phi = \left(\frac{\text{desired final diameter}}{\text{present diameter}} \times 300\right) + 60$$

Thus, if a final "butt" diameter of four inches is desired, the angular relationship between the reference pulse and the pulse shaper and reset circuit output pulse will correspond to that shown by the pulses 66A-66E, wherein the control pulse will occur at 90° when the expiring roll diameter is 40 inches, the control pulse will occur at 120° when the expiring roll diameter is 20 inches, the control pulse will occur at 180° when the expiring roll diameter is 10 inches, the control pulse will occur at 300° when the expiring roll diameter is 5 inches and the control pulse will occur at 360° when the expiring roll diameter is 4 inches. From the foregoing, it may be seen that coincidence occurs between the reference pulse and the control pulse when the diameter of the expiring roll is 4 inches which is the desired final "butt" diameter of the expiring roll. Since any diameter larger than 4 inches will cause the control pulse to appear before the reference pulse, it will be apparent that the resolution of the system is one revolution of the expiring roll and the maximum error is +0 to −1 wrap of the webbing on the expiring roll or, in the case of paper for newspapers which is .003 inch thick, +0 to −.006 inch.

Accordingly, it may be seen that when the desired final "butt" diameter of the expiring roll is 4 inches, coincidence occurs between the reference pulse and the control pulse which, as previously mentioned, causes the output control circuit 60 to be rendered operative for the second time, i.e., "second firing" of the output control circuit 60 occurs and the splicing of the new roll web to the expiring roll web is affected.

As previously set forth, the first operation of the output control circuit 60, i.e., the "first firing" thereof, must occur at a time period prior to the "second firing" which will allow time for the preliminary operations to be accomplished before the "second firing," the time required for such preliminary operations being substantially constant regardless of the press speed. Since the time required for the expiring roll diameter to reach the desired final "butt" size is dependent upon the velocity at which the web is being fed to the press, i.e., is dependent upon the press speed, the time prior to the "second firing" at which the "first firing" must take place is also dependent upon the velocity of the running web W and the press speed.

Referring to FIG. 5, a graph is shown which illustrates the relationship between papers per hour and the "butt" diameter increase over final "butt" size at which "first firing" is to occur for a newspaper printing press operation. From this graph it can be seen that, if the press is running so that 30,000 papers are printed per hour, the "first firing" will ideally come when the diameter of the expiring roll is approximately 3.2 inches greater than the desired final "butt" size. If the press is running so that 60,000 papers per hour are being printed, the "first firing" will ideally come when the expiring roll diameter is approximately 6.4 inches greater than the desired final "butt" size. Accordingly, if a 4 inch final "butt" size is desired, the "final firing" will occur when the expiring roll diameter is approximately 7.2 inches in the first example and 10.4 inches in the second example and the "second firing" will occur in both examples when the expiring roll diameter is approximately 4 inches, i.e., 4 inches +0 to −.006. Additionally, it will be apparent that, if the final "butt" size is increased, the diameter at the time of "first firing" is increased an equal amount.

By reference to FIG. 4, it may be seen that, if the "first firing" is to occur when the expiring roll diameter is 10.4 inches, the counter 52 must be filled causing a control pulse to be produced by the pulse shaper and reset circuit 55 slightly before a 180° relationship exists with the reference pulse, the actual angle having been found by experimentation to be approximately 177°. Accordingly, the pulse stretcher circuit 58 produces an output pulse having a time period corresponding to the time period for the commutator to sweep from the 177° point to the 360° point so that the reference pulse and the stretched pulse timingly overlap.

Referring to FIG. 6, the timed relationship between the closure of the commutator, i.e., the production of a reference pulse, illustrated by wave form 65A and the production of the stretched pulse illustrated by wave form 70A is shown prior to the time when the "first firing" is to occur since the reference pulse and the stretched pulse do not timingly overlap. Referring to FIG. 7, the timed relationship between the commutator closure, i.e., the production of the reference pulse, illustrated by wave form 65A and the production of the stretched pulse 70A, as illustrated at a time when the "first firing" is to occur since the reference pulse and the stretched pulse timingly overlap at point B, the control pulse being provided at point A. Referring to FIG. 8, the timed relationship between the commutator closure, i.e., the production of the reference pulse, illustrated by wave form 65A and the production of a control pulse 70B by the pulse shaper and reset circuit 55, is illustrated at a time when the "second firing" is to take place since the reference pulse and the control pulse timingly overlap at point A.

In general, the operation of the control system illustrated in FIG. 2 is as follows. In response to rotation of the expiring roll 11A, the commutator 40 is rotated so that a triggering signal is produced at the brush 41C which is transmitted to the gate 46 causing the gate to be opened so that pulses may pass therethrough. In response to the passage of the running web W to the press, the gear 49 is rotated at a speed determined by the speed of the running web W so that pulses are induced in the magnetic pickup device 48 by the passage of teeth of the gear 49. In response to the passage of each tooth of the gear 49, an output pulse is produced at the output of the gate 46 which is transmitted to the counter 52. When a selected number of pulses have entered the counter 52, an output pulse is produced thereby which is transmitted to the pulse shaper and reset circuit 65 causing operation thereof. When the pulse shaper and reset circuit operates, the counter 52 is reset and the gate 46 is closed. Additionally, a control pulse from the pulse shaper and reset circuit 55 is transmitted through the normally closed contact 56 to the pulse stretcher circuit 58 which produces an output pulse having a preset time period. When the reference pulse produced by the commutator 40 at brush 41B and the stretched control pulse timingly overlap, the coincidence sensing circuit 45 is rendered operative to initiate operation of the output control circuit 60, i.e., initiates "first firing" thereof, and the output control circuit in turn initiates the previously described preliminary operations of the apparatus illustrated in FIG. 1. Additionally, during the "first firing" the output control circuit 60 opens the normally closed contact 56 and closes the normally opened contact 61 so that subsequently the control pulses produced by the pulse shaper and reset circuit 55 are transmitted directly to the coincidence sensing circuit 45. Thereafter when the reference pulse and a non-stretched control pulse timingly overlap, the coincidence sensing circuit 45 is again rendered operative to initiate operation of the output control circuit 60, i.e., to initiate "second firing" thereof, and the output conrol circuit in turn initiates the previously described splicing operation of the apparatus illustrated in FIG. 1.

*Pulse shaper, integrator and inverter circuit 50, and gate 46*

Referring to FIG. 9, the pulse shaper, integrator and inverter circuit 50 and the gate 46, illustrated in block form in FIG. 2, are illustrated in detailed schematic form, the pulse shaper, integrator and inverter circuit 50 being broken up into three separate circuits, designated as a pulse shaper circuit 81, the differentiator circuit 82 and an inverter circuit 83. The gate 46 has a pair of close gate input terminals 85 and 86 which are respectively connected to the pulse shaper and reset circuit 55 and to the output control circuit 60, illustrated in block form in FIG. 2. Additionally, the gate 46 has an open gate input 87 connected to brush 41C associated with the commutator 40 in FIG. 2. The gate 46 is a bistable multivibrator which includes a pair of gating transistors 88 and 89. The collectors are respectively connected to a positive source of potential B+ through resistors 91 and 92, the emitters are connected to ground through a diode 93, and the bases are respectively connected to the collector of the other transistor through resistors 94 and 95.

At the beginning of an operation, as will be described later, a negative signal is applied to the input terminal 86 of the gate from the output control circuit 60. The negative input signal is applied to the collector of transistor 88 and causes transistor 89 to be rendered nonconductive since the base thereof is resistance coupled to the collector of transistor 88. When the transistor 89 is rendered nonconductive, the potential at the collector thereof rises toward the positive potential B+ so that the transistor 88 is rendered conductive since the base thereof is resistance coupled to the collector of transistor 89. When transistor 88 is conductive, the gate 46 is closed and the transmission of the pulses from the differentiator 82 to the inverter 83 is inhibited, as will be described hereinafter.

As mentioned with respect to operation of the block diagram of the control system in FIG. 2, the gate 46 is opened when a ground triggering pulse is applied thereto. A pair of transistors 100 and 101 are provided for controlling operation of the gate 46 in response to the application of a ground triggering pulse to the open gate input terminal 87 which is connected to brush 41C associated with the commutator 40. Transistor 100 is normally conducting since its base is connected to the center terminal between a pair of voltage dividing resistors 103 and 104 connected in series between the positive potential B+ and ground so that the base is positive with respect to the emitter. The base of the transistor 101 is resistance coupled to the collector of transistor 100 so that transistor 101 is normally nonconducting since the collector of transistor 100 is at ground potential when the transistor 100 is conducting. The collector of the transistor 101 is connected to the collector of transistor 89 in the gate 46 through a diode 105 and the transistor 101 has no effect on the gate 46 as long as transistor 101 is nonconducting.

When a ground triggering signal is provided at the open gate input terminal 87 in response to rotation of the commutator 40, the transistor 100 is rendered nonconductive since its base is connected to the input terminal 87. When transistor 100 is rendered nonconductive, the potential at the collector thereof rises so that the transistor 101 is rendered conductive. Accordingly, when transistor 101 is rendered conductive, the collector thereof is clamped to ground so that current is permitted to flow from the positive potential B+ through resistor 92 in the gate 46, through the diode 105 to ground. This causes the potential at the collector of transistor 89 in the gate to drop so that transistor 88 is rendered nonconductive. Consequently, the potential at the collector of transistor 88 then rises so that transistor 89 is rendered conductive and the gate 46 is opened. Under these conditions, pulses are permitted to pass from the differentiator 82 to the inverter 83, as will be described below.

The pulse shaper circuit 81 has a pair of input terminals 110 and 111 which are connected to the output of the magnetic pickup device 48 which provides an A.-C. output between terminals 110 and 111 in response to the passage of teeth on the gear 49, as previously described and as is shown in FIG. 9. The pulse shaper circuit 81 also has an output terminal 112 which corresponds to the input terminal of the differentiator circuit 82. A pair of transistors 114 and 115 are provided in the pulse shaper circuit 81 for causing a negative-going pulse to be provided at the output terminal 112. Transistor 114 is normally conducting since its base is connected to the center terminal of a pair of voltage dividing resistors 116 and 117 connected in series between the positive potential B+ and ground. The base of transistor 115 is connected to the collector of transistor 114 so that transistor 115 is normally nonconductive since the collector of transistor 114 is clamped to ground when transistor 114 is conductive. The output terminal 112 is connected to the collector of transistor 115 and, accordingly, the potential at terminal 112 will be at substantially the positive potential B+ since the collector of transistor 115 is at substantially that potential when transistor 115 is nonconductive.

In response to the positive half cycle of a sine wave cycle produced by the magnetic pickup device 48 in response to the passage of a gear tooth, the transistor 114 is rendered nonconductive since the base thereof is connected to terminal 111 so that the potential at the collector thereof rises toward the positive potential B+ causing the transistor 115 to be rendered conductive. When transistor 115 is rendered conductive, the potential at the collector thereof drops to ground. When the positive half cycle of the sine wave subsides, the transistor 114 again is rendered conductive and the transistor 115 is rendered nonconductive so that the potential at the collector of transistor 115 again rises toward the positive potential B+. Accordingly, as illustrated in FIG. 9, a negative-going pulse is provided at the collector of transistor 115 in response to the positive half cycle of the A.-C. sine wave induced by a gear tooth and this negative pulse is provided at the output terminal 112.

As previously mentioned, the differentiator circuit 82 has an input terminal 112 which corresponds to the output terminal of the pulse shaper circuit 81 and also has an output terminal 120 which corresponds to the input terminal of the inverter circuit 83. The differentiator circuit 82 includes a transistor 121 which is normally conducting since its base is connected through a capacitor 122 to the input terminal 112 and a positive potential is normally provided at terminal 112 since it is connected to the collector of the normally nonconducting transistor 115 in the pulse shaper circuit 81. The collector of transistor 121 is connected to the output terminal 120 through a diode 124 and the collector of the transistor 121 is normally at ground potential since the transistor 121 is normally conducting. When a negative-going output pulse is provided at terminal 112 by the pulse shaper circuit 81, the transistor 121 is rendered nonconductive so that the potential at the collector rises toward the positive potential B+ causing a positive-going output pulse to normally be provided at the output terminal 120. The collector of the transistor 121 is also connected to the collector of the transistor 88 in the gate 46 through a diode 125 so that, when the gate 46 is closed and the transistor 88 is conductive, positive-going pulses provided at the collector of the transistor 121 are shunted to ground through the transistor 88 and have no effect on the output terminal 120 of the differentiator circuit 82.

The inverter circuit 83, as previously mentioned, has an input terminal 120 which corresponds to the output terminal of the differentiator circuit 82 and also has an output terminal 127 which is connected to the input of the counter 52 illustrated in block form in FIG. 2. The inverter circuit 83 includes a transistor 130 which is normally nonconducting since the base is connected through a capacitor 131 to the center terminal of a pair of resistors 133 and 134 connected between the positive potential B+ and ground so that the potential at the collector thereof is at substantially the same potential as the positive potential B+, the input terminal 120 being connected to the center terminal of resistors 133 and 134. Under steady-state conditions, the capacitor 131 charges to the potential at input terminal 120 through resistor 135 so that the base of the transistor 130 is normally maintained at ground potential and transistor 130 is normally nonconductive. When the gate 46 is open and a positive-going pulse is provided at the input terminal 120 by the differentiator circuit 82, the transistor 130 is rendered conductive so that the potential at the collector thereof drops to ground and a negative-going output pulse is provided at the output terminal 127 of the inverter circuit 83 which triggers the counter 52.

Thus, it may be seen that, when the gate 46 is open, a negative-going around output pulse is provided at the output terminal 127 of the inverter circuit 83 for each cycle of the sine wave provided by the magnetic pickup device 48, the sine wave cycles corresponding to the number of gear teeth passing by the magnetic pickup device 48 and the rate of passage of the gear teeth depending on the speed of travel of the travelling web W. Accordingly, it may be seen that a train of negative-going ground output pulses will be provided at the output terminal 127 at a rate dependent upon the speed at which the running web W is travelling, the negative-going ground output pulses being transmitted to the counter 52.

Subsequently, as will be set forth hereinafter, when the counter 52 is filled, a ground pulse is applied to the gate 46 by the pulse shaper and reset circuit 55, the ground pulse being applied to terminal 85. In response to the ground pulse, gating transistor 89 is rendered nonconductive and gating transistor 88 is rendered conductive. Consequently, the transmission of pulses from the differentiator 82 to the inverter 83 is inhibited, the pulses being shunted to ground through gating transistor 88.

*Counter 52*

Referring to FIG. 10, the counter 52 is symbolically illustrated in the form of a binary scaler having eight stages, each stage consisting of flip-flops FF1–FF8. Since the binary scaler is of the conventional form, the details thereof will not be described. Suffice it to say that, in response to each odd-numbered input pulse applied to a scaler stage input terminal, the flip-flop is "set" and, in response to each even-numbered input pulse applied to a stage input terminal, the flip-flop is "reset." The input terminal of the first stage flip-flop is connected to a counter input terminal 127 which corresponds to the output terminal 127 of the inverter circuit 83, illustrated in FIG. 9, so that the train of negative-going ground output pulses produced at terminal 127, when gate 46 is open, are counted in the counter 52. The input terminal of each subsequent flip-flop stage is connected to the R output terminal of the next preceding flip-flop stage so that, when the next preceding flip-flop stage is reset, an input pulse is applied to the input terminal of the next succeeding flip-flop stage. Additionally, a reset input terminal 140 is associated with R input terminals of the flip-flops FF1–FF8 so that, when a reset pulse is applied thereto from the pulse shaper and reset circuit 55, as described later, all of the flip-flops FF1–FF8 are reset. The S output terminals of the flip-flops FF1–FF8 are respectively connected to output terminals 141–148 so that a positive output signal is normally produced at terminals 141–148 and a ground output signal is produced at the associated one of output terminals 141–148 when a flip-flop is set, the ground output signals controlling operation of the pulse shaper and reset circuit, as set forth hereinafter. The flip-flops FF1–FF8 are respectively affected by every one, every second, every fourth, every eighth, every sixteenth, every thirty-second, every sixty-fourth, and every one hundred and twenty-eighth input pulse produced at the input terminal 127.

*Pulse shaper and reset circuit 55 and pulse stretcher circuit 58*

Referring to FIG. 11, the pulse shaper and reset circuit 55 and the pulse stretcher circuit 58 are illustrated in detailed schematic form. A plurality of input terminals 144–148 are provided therein which respectively correspond to the output terminals 144–148 associated with the S output terminals of the flip-flops FF4–FF8 in the counter 52 illustrated in FIG. 10. Additionally, an input terminal 150 is provided therein which corresponds to an output terminal 150 associated with the R output terminal of flip-flop FF2 in the counter 52 and an input terminal 152 is provided which is connected to a corresponding output terminal in the output control circuit 60, as will be described hereinafter. Further, an output terminal 85 is provided which corresponds to the previously-discussed close gate input terminal 85 associated with the gate 46 illustrated in FIG. 9, an output terminal 140 is provided which corresponds to the previously-discussed reset input terminal 140 associated with the counter 52 illustrated in FIG. 10, and an output terminal 155 is provided which corresponds to an input terminal associated with the coincidence sensing circuit 45, as will be described hereinafter.

A selector switch 160 is provided so that the input terminals 144–148 and, thus, the S output terminals of the flip-flops FF4–FF8 in the counter 52 may be selectively associated with the pulse shaper and reset circuit 55 by movement of the contact arm 160A. Accordingly, the selector switch 160 allows for selecting the count in the counter 52 at which the pulse shaper and reset circuit 55 is rendered operative. For example, if the selector switch 160 is preset as illustrated, input terminals 146, 148 and 150 are associated with the pulse shaper and reset circuit 55 so that the S output terminals of flip-flops FF6 and FF8 and the R output terminal of flip-flop FF2 are associated therewith. Under normal conditions when pulses are being counted in counter 52, terminal 161 in the pulse shaper and reset circuit 55 is at a positive potential since a positive signal is provided at at least one of the input terminals 146 and 148 since either flip-flop FF6 or flip-flop FF8 will be reset until the desired count is attained. During this time, a filtering capacitor 162 charges to the potential of the positive signal produced by flip-flops FF6 and FF8 through a charging resistor 159A. When the desired count has been attained by the counter 52, a ground signal will be produced at the input terminals 146, 148 and 150 and, subsequently, the filtering capacitor 162 discharges through a discharging resistor 159B. Thus, a time delay period after the desired count is attained, terminal 161 will be at ground potential, the time delay period being determined by the discharge time of capacitor 162. With the selector switch setting illustrated, ground signals will be provided at terminals 146, 148 and 150 when one hundred and sixty pulses have been counted by the counter 52. Such is the case since the eighth stage flip-flop FF8 is "set" when one hundred and twenty-eight pulses have been received and the sixth stage flip-flop FF6 is "set" when thirty-two pulses have been received, the summation of these pulses being one hundred and sixty and the second stage flip-flop FF2 being in the "reset" condition at this time. Accordingly, ground signals are provided by flip-flops FF2, FF6 and FF8.

A transistor 163 has its base connected to terminal 161 so that, when terminal 161 is positive, the transistor 163 is conducting and, when terminal 161 is grounded, transistor 163 is rendered nonconductive. Thus, when the counter 52 has attained the preselected count, transistor 163 switches from a conducting state to a nonconducting state. When transistor 163 is rendered nonconductive, the potential at the collector thereof rises toward a positive potential B+ and a normally nonconducting transistor 164 is rendered conductive since its base is resistance coupled to the collector of transistor 163. In response to conduction of transistor 164, the collector thereof drops to ground potential causing a ground signal to be produced at output terminal 85 which is associated with the collector, the ground signal being transmitted to the gate 46 and causing the gate 46 to be closed so that the further passage of pulses from the differentiator circuit 82 to the inverter circuit 83 is inhibited, as previously described hereinabove with respect to FIG. 9.

Additionally, the ground signal provided at the collector of transistor 164 is applied to the base of a normally conducting counter reset transistor 165 through a resistor 167A so that transistor 165 is rendered nonconductive. During the time period when the collector of transistor 164 is positive, a capacitor 166 in the base circuit charges through resistor 167A to the positive potential and, when transistor 164 is rendered conductive so that the collector is clamped to ground, the capacitor 166 discharges through a resistor 167B maintaining transistor 165 conductive until the charge is dissipated. When transistor 165 is rendered nonconductive, the collector thereof rises toward a positive potential B+ causing a positive signal to be produced at output terminal 140 which corresponds to the reset input 140 of the counter circuit 52 in FIG. 10 and causes flip-flops FF1–FF8 to be reset, as previously described with respect to the operation of counter 52. Thus, the counter 52 is not reset until a time period after the desired count is attained, the time period being determined by the discharge time of capacitor 166.

Further, when ground potential is provided at the collector of the transistor 164, a normally conducting transistor 168 is rendered nonconductive since its base is connected to the collector of transistor 164 through the diode 170. When transistor 168 is rendered nonconductive, the potential at the collector thereof rises toward the positive potential B+ so that a normally nonconducting transistor 171 is rendered conductive, the base of the transistor 171 being resistance coupled to the collector of transistor 168 and the potential at the collector thereof dropping to ground potential.

The collectors of transistors 164 and 171 are both connected to output terminal 155 when corresponds to input terminal 155 in the coincidence circuit 45 so that, when either of the transistors 164 and 171 is conducting and the associated collector is clamped to ground, a ground signal is transmitted to the coincidence circuit, the purpose of which will be set forth later.

When the counter 52 is reset, a positive signal is again transmitted therefrom through the selector switch 160 to terminal 161 causing transistor 163 to be rendered conductive and transistor 164 nonconductive. When transistor 164 is nonconductive, a ground signal is no longer transmitted therefrom to the coincidence circuit 45, a ground signal being produced during the time period required for capacitor 166 to discharge so that transistor 165 is rendered nonconductive.

Still further, when the collector of transistor 164 drops to ground potential, a normally conducting transistor 173 is rendered nonconductive since its base is also resistance coupled to the collector of transistor 164 through the diode 170. When the transistor 173 is rendered nonconductive, the potential at the collector thereof rises toward the positive potential designated at B+. A capacitor 175 is connected to the collector through a variable resistor 176 which charges toward the collector potential through the variable resistor. When the charge on the capacitor 175 has attained a prescribed level, a unijunction transistor 180 is rendered conductive and the capacitor 175 is permitted to discharge through the unijunction transistor and through a resistor 181. The time required for the capacitor to charge to the prescribed level which causes the unijunction transistor to be rendered conductive is preset at a desired level by presetting the variable resistor 176. As the capacitor 175 discharges through resistor 181, a positive voltage is developed thereacross which is fed back to the base of a normally nonconducting transistor 182 and causes transistor 182 to be rendered conductive so that the collector thereof is clamped to ground. The collector of transistor 182 and the collector of transistor 168 are connected together and therefore the base of transistor 171 is also resistance coupled to the collector of transistor 182. Accordingly, when the collector of transistor 182 is clamped to ground, the transistor 171 is rendered nonconductive causing the collector thereof to rise toward the positive potential B+ so that the potential at terminal 155 also goes positive and a ground signal is no longer transmitted to the coincidence circuit 45.

From the foregoing, it may be seen that when a preselected count is attained in the counter 52, transistors 164 and 171 are rendered conductive so that a ground signal is applied to the coincidence circuit 45 from transistors 164 and 171, the ground signal from transistor 164 only lasting until the counter 52 is reset, and a time period thereafter determined by the time required for the unijunction transistor 180 to be rendered conductive, transistor 171 is rendered nonconductive so that a ground signal is no longer provided. Accordingly, a ground output signal is produced at the output terminal 155 for a time period corresponding to the time required for the capacitor 175 to charge to a sufficient level for causing the unijunction transistor 180 to be rendered conductive. Additionally, the gate 46 is closed and the counter 52 is reset to a "zero" condition.

As described hereinabove with respect to FIGS. 1 and 2, when the stretched pulse and the reference pulse timingly overlap, the coincidence sensing circuit 45 is rendered operative causing the output control circuit 60 to be rendered operative, i.e., causing "first firing" thereof, so that the preliminary operation of the apparatus in FIG. 1 takes place. When the carriage 31 is moved to the operative position, the normally closed contacts of the carriage limit switch 1CLS are opened and the noramlly opened contacts of the carriage limit switch 2CLS are closed. Referring again to FIG. 11, a normally closed contact of limit switch 1CLS, which performs the functions of contacts 56 and 61 in FIG. 2, i.e., to render the pulse stretcher ineffective, is associated with a transistor 185 and normally clamps the base thereof to ground so that transistor 185 is normally nonconducting. When contact 1CLS is opened in response to the "first firing" as the carriage 31 is moved to the operative position, the transistor 185 is rendered conductive since its base is then connected to the center terminal of a pair of voltage divider resistors 186 and 187 which in turn are connected between the positive potential B+ and ground. The collector of transistor 185 is connected to the collectors of transistors 168 and 182 and, therefore, is resistance coupled to the base of transistor 171. Accordingly, when transistor 185 is rendered conductive, the collector thereof is clamped to ground causing the base of transistor 171 to be clamped to ground so that transistor 171 is maintained nonconductive regardless of the conducting states of transistors 168 and 182. Since transistors 168 and 182 can have no effect on transistor 171, the effect of the pulse stretching circuit 58 is negated, the effect of the pulse stretching circuit being negated as long as the carriage is in the operative position and contacts of limit switch 1CLS are open.

Subsequently, when the count in the counter 52 attains the desired level, a ground signal is produced at terminal 161 causing transistor 163 to be rendered nonconductive and transistor 164 to be rendered conductive. When transistor 164 is rendered conductive, the collector thereof is clamped to ground and, since the output terminal 155 is connected to the collector through diode 170, a ground signal is applied to the coincidence circuit 45 from transistor 164. The time period during which the ground signal is provided under these circumstances is determined by the discharge time for capacitor 166, as previously set forth. The circuit components are so selected that the discharge time for capacitor 166 is much less than the charging time of the capacitor 175 before the unijunction transistor 180 is rendered conductive. The discharge time for capacitor 166 determines the control pulse time period and the charging time for capacitor 175 determines the stretched pulse time period, i.e., the time periods that the output terminal 155 is grounded or has a ground signal applied thereto.

*Coincidence sensing circuit 45 and output control circuit 60*

Referring to FIG. 12, the coincidence sensing circuit 45 and the output control circuit 60, illustrated in block form in FIG. 2, are illustrated in detailed schematic form. Included therein are an input terminal 155 which corresponds to output terminal 155 in FIG. 11, an input terminal 190 which corresponds to the brush 41B associated with the commutator 40 in FIG. 2, an output terminal 86 which corresponds to the close gate input terminal 86 for the gate in FIG. 9, and an output terminal 152 which corresponds to the input terminal 152 for the pulse shaper and reset circuit 55 in FIG. 11.

The coincidence sensing circuit 45 includes a pair of transistors 192 and 193 which are normally conducting since their bases are respectively connected to the center terminals of voltage dividers consisting of resistors 194 and 195 and resistors 196 and 197, the voltage dividers being connected between the positive potential B+ and ground. The bases of transistors 192 and 193 are also respectively connected to input terminals 190 and 155 so that, when ground signals are simultaneously received at input terminals 190 and 155, i.e., a reference pulse and a stretched pulse or a control pulse timingly overlap, transistors 192 and 193 are simultaneously rendered nonconductive. The collectors of transistors 192 and 193 are connected together, and, accordingly, when only one of the transistors is conductive or both are conductive, the common collector terminal is clamped to ground. However, when both transistors 192 and 193 are rendered nonconductive in response to the simultaneous receipt of ground signals at terminals 190 and 155, the potential at the common collector terminal rises toward the positive potential B+ causing a normally nonconducting transistor 200 to be rendered conductive since its base is resistance coupled to the common collector terminal.

When transistor 200 is rendered conductive, its collector is clamped to ground causing a normally conducting transistor 202 in a bistable multivibrator 201 to be rendered nonconductive and a normally nonconductive transistor 203 in the multivibrator 201 to be rendered conductive, the base of transistor 202 being resistance coupled to the collectors of transistors 200 and 203 and the base of transistor 203 being resistance coupled to the collector of transistor 202. Accordingly, the collector of transistor 203 is clamped to ground and the collector of transistor 202 rises toward the positive potential B+. In response to the clamping of the collector of transistor 203 to ground, a normally conducting transistor 205 is rendered nonconductive since its base is resistance coupled to the collector and, in response to the collector of transistor 202 rising toward the positive potential B+, a normally nonconducting transistor 206 is rendered conductive causing a paster pilot relay PPR connected in the collector circuit of transistor 206 to be energized to initiate preliminary operations or splicing operations of the apparatus illustrated in FIG. 1, as will be described below.

When transistor 205 is rendered nonconductive and the potential at the collector thereof rises, a capacitor 208 associated therewith charges toward the collector potential through resistor 209. When the charge on capacitor 208 attains a sufficient level, a unijunction transistor 210 is rendered conductive so that the capacitor 208 is permitted to discharge therethrough and through a resistor 211. As capacitor 208 discharges through resistor 211, a potential is developed thereacross which renders a normally nonconducting transistor 212 conductive so that the collector thereof is clamped to ground. Since the collector of transistor 212 is also resistance coupled to the base of transistor 206 which controls the energization of the paster pilot relay PPR, transistor 206 will be rendered nonconductive when transistor 212 is rendered conductive so that the paster pilot relay PPR is deenergized. Thus, it may be seen that in response to the simultaneous receipt of ground signals at input terminals 190 and 155, the paster pilot relay PPR is energized for a time period corresponding to the time period required for capacitor 208 to charge to a sufficient level to cause the unijunction transistor 210 to be rendered conductive.

A "begin operation" transistor 215 is provided in the output control circuit 60 for making sure that at the beginning of an operation the gate 46 is closed, the output at terminal 155 of the pulse shaper and reset circuit 55 is normally positive, and that the condition of the bistable multivibrator 201 in the output control circuit is such that, under normal conditions, transistor 202 is conducting and transistor 203 is nonconducting. When a splicing operation is to be controlled and power, i.e., the positive potential B+, is initially applied to the output control circuit 60, transistor 215 is rendered conductive since its base is connected to the center terminal of a voltage divider consisting of resistors 216 and 217 and the collector thereof is clamped to ground. When the collector of transistor 215 is clamped to ground, the base of transistor 203 in the multivibrator 201 is clamped to ground causing the transistor 203 to be rendered nonconductive which in turn causes the transistor 202 to be rendered conductive as is common in bistable multivibrator. Additionally, a ground signal is transmitted to output terminal 86 which corresponds to input terminal 86 of the gate 46 in FIG. 9 which causes the gate 46 to be closed. Further, a ground signal is produced at output terminal 152 which corresponds to input terminal 152 in FIG. 11 which assures that transistor 171 is nonconductive since terminal 152 is connected to the base of transistor 171 so that the output at terminal 155 is initially positive. When power has been on for a sufficient period of time, a capacitor 218 associated with the base of transistor 215 will have charged to the positive potential designated as B+ so that the transistor base is clamped to ground and transistor 215 is rendered nonconductive. Accordingly, it may be seen that transistor 215 only affects the operation of the control system when power is initially applied thereto and is provided to assure that certain transistors in the control system are in desired states of conduction or nonconduction.

Referring to FIG. 13, the safety circuit 62, illustrated in block form in FIG. 2, is illustrated in detailed schematic form. As previously set forth, when the press is running, signals from the magnetic device 48 alternately cause transistor 114 (FIG. 9) to turn ON and OFF. Since the base of transistor 220 is connected to the base of transistor 114, it is also pulsed ON and OFF by the magnetic device 48. When transistor 220 is OFF, its collector rises to B+ and capacitor 223 is charged through diode 224. Since transistor 221 is resistance coupled to capacitor 223, it is turned ON. This causes the emitter of transistor 221 to rise to B+ and transistor 222 being resistance coupled to the emitter of transistor 221 through zener diode 225 is turned ON. The collector of transistor 222, therefore, goes to ground potential and relay PPL is energized turning ON pilot light PL (see FIG. 2). When transistor 220 is pulsed ON the collector of transistor 220 goes to ground potential and capacitor 223 tends to discharge through transistor 221. However, the time constant of the discharge path through transistor 221 is much larger than the time constant of the charging path through resistor 228 and diode 224 and as long as transistor 220 is being pulsed ON and OFF capacitor 223 will remain sufficiently charged to hold transistor 221 in its conductive state. This, as described above, causes PPL to be energized and PL to be turned on.

When the press is stopped, the base of transistor 220 being connected to the base of transistor 114 is biased positive by voltage dividing resistors 116 and 117 since no signal is being received from the magnetic device 48. Therefore, the collector of transistor 220 goes to ground potential. This causes diode 224 to be reverse biased and capacitor 223 will discharge through transistor 221. Subsequently, transistors 221 and 222 are turned OFF causing PPL to be deenergized, PL to be turned OFF and a positive potential to appear through elements 226, 227 and 229 at the base of transistor 215 (FIG. 12). This causes transistor 215 to be conductive and thereby perform its functions of gate control, counter reset, and the prevention of an output to the splicing apparatus as set forth above with respect to FIG. 12.

Simplified wiring diagram of control circuitry

Figure 14:
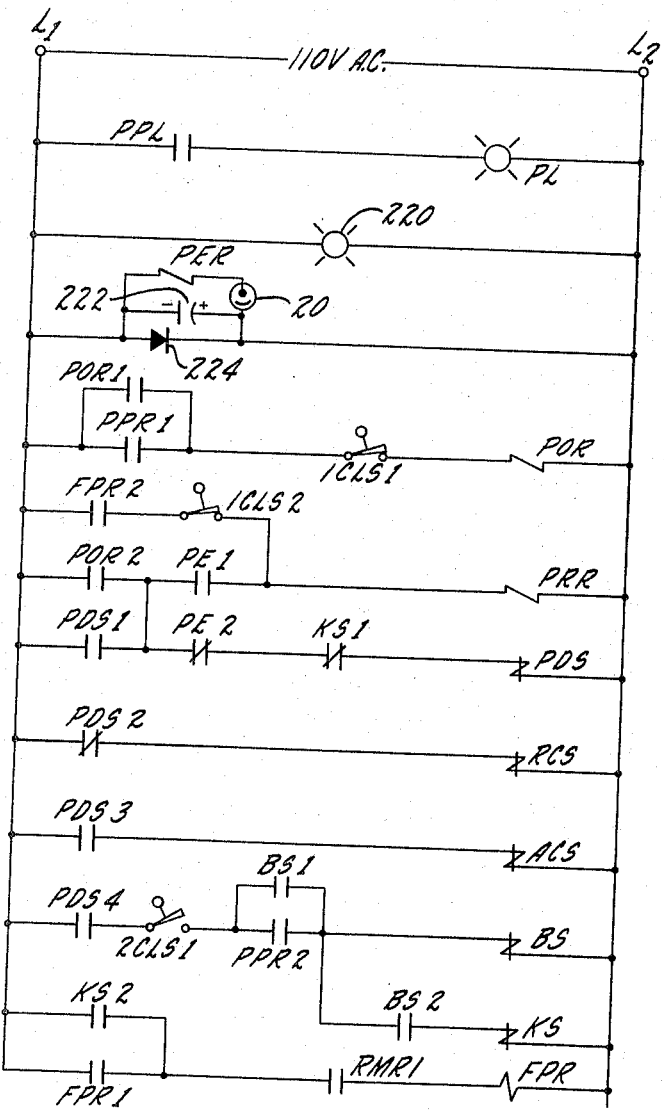
FIG. 14 is a schematic wiring diagram of controls for accomplishing fully automatic operation of the apparatus illustrated in FIG. 1.

A simplified wiring diagram of the control circuitry is illustrated in FIG. 14 for controlling operation of the apparatus illustrated in FIG. 1. For more specific details of the control circuitry, reference is again made to the above-mentioned Pedersen et al. and Chase et al. patents.

Since the relay PPL (FIG. 13) is energized when the press is running, the indicator light PL is "ON" since it is connected between the supply lines L1 and L2 through a normally open contact PPL of relay PPL. Conversely, the light is "OFF" when relay PPL is deenergized (press not running) and contact PPL is open. Also, as previously set forth, when coincidence occurs between the reference pulse and the stretched pulse, "first firing" is to take place and the preliminary operations of the apparatus illustrated in FIG. 1 are to take place. Additionally, as set forth with respect to the description of FIG. 12, when coincidence occurs between the reference pulse and the stretched pulse, the paster pilot relay PPR is energized. When the paster pilot relay PPR is energized, its associated contacts PPR1 and PPR2 in FIG. 13 are closed. In response to closure of the contact PPR1, a preliminary operation relay POR is energized since it is connected between A.-C. supply lines L1 and L2 through contact PPR1 and through a contact 1CLS1 of the limit switch 1CLS, it being previously set forth that the contacts of limit switch 1CLS are closed when the carriage 31 in FIG. 1 is in the "stowed" position. When energized, the preliminary operation relay POR locks itself in, around contact PPR1 through its associated contact POR1 and also causes contact POR2 to be closed.

When contact POR2 is closed, the position reel relay PRR, referred to in FIG. 1, is energized since it is connected between the supply lines L1 and L2 through contact POR2 and a photoelectric contact PE1 which is closed. As previously mentioned, the photoelectric cell 20 is energized by light until the new roll 11B is moved adjacent the running web W. As may be seen by reference to FIG. 13, a photoelectric relay PER is energized as long as the photoelectric cell 20 is energized, a light source 220 being connected across the A.-C. supply lines L1 and L2 for providing light which energizes the photocell 20. The photocell 20 has its cathode and anode connected to receive the D.-C. potential appearing across a filtering capacitor 222 which is charged by a rectifier 224 connected across the lines L1 and L2. The coil of the photoelectric relay PER is connected in series with the anode-cathode circuit of the photocell 20 so that, when the light beam from the lamp 220 is broken by the periphery of a new roll of web mounted on the reel stand RS, conduction of the photocell 20 is terminated and the relay PER is deenergized. Thus, it will be understood that the relay PER is normally energized except when the new roll is moved into a position adjacent the running web and thus interrupts the light beam. Accordingly, contact PE1 is closed and a second photoelectric contact PE2 is open when the photocell 20 is energized, the contact conditions reversing when the photocell 20 is deenergized in response to the new roll interrupting the light beam.

The reel motor controller RMC in FIG. 1 is rendered operative in response to energization of the position reel relay PRR so that the reel motor RM is energized to impart rotation to the spider assembly 14. When the spider assembly 14 has rotated such that the new roll 11B is adjacent the running web W, the light beam from the lamp 220 is broken by the periphery of the new roll and conduction of the photocell 20 is terminated so that the photoelectric relay PER is deenergized. In turn, the position reel relay PRR is deenergized since contact PE1 is opened so that operation of the reel motor controller RMC and the reel motor RM are terminated.

The predrive solenoid PDS, referred to in FIG. 1, is then energized since it is connected between the supply lines L1 and L2 through a normally closed contact KS1 of the cutter solenoid KS, through the contact PE2 which is closed since the photoelectric relay PER is now deenergized, and through the normally open contact POR2 of the preliminary operation relay POR which is now closed since the preliminary operation relay POR is energized. The predrive solenoid PDS locks itself in, around the contact POR2 through its own normally open contact PDS1 which is now closed. In response to energization of the predrive solenoid PDS, the predrive controller PDC is rendered operative so that the predrive belt 26 is moved into engagement with the new roll, designated in FIG. 1 as roll 11B, and the new roll 11B is predriven at a speed corresponding to the velocity of the running web W.

The return carriage solenoid RCS and the advance carriage solenoid ACS in FIG. 1 are respectively deenergized and energized in response to the energization of the predrive solenoid PDS since they are respectively connected between the power supply lines L1 and L2 through a normally closed contact PDS2 and a normally open contact PDS3 of the predrive solenoid PDS. Accordingly, the carriage controller CC is operated to render the carriage position motor CPM operative in the advancing direction so that the carriage 31 is moved from the "stowed" position to the operative position adjacent the running web W. As previously mentioned, limit switch 1CLS is opened and limit switch 2CLS is closed when the carriage 31 is moved from the "stowed" position to the operative position.

In response to closing of the limit switch 2CLS, the brush solenoid BS is conditioned for energization since it is connected between the supply lines L1 and L2 through the normally open contact PDS4 of the predrive solenoid PDS which is closed since the predrive solenoid is energized, through the normally open limit switch 2CLS which is now closed, and through the normally open contact PPR2 of the paster pilot relay PPR. Subsequently, when coincidence occurs between the reference pulse and the control pulse, i.e., ground signals are simultaneously received at input terminals 190 and 155 of the coincidence circuit in FIG. 12, the paster pilot relay PRR is energized so that contact PPR2 is closed and the brush solenoid BS is energized causing the brush 35 to deflect the running web W into engagement with the web on the new roll 11B whereby the web on the new roll 11B is spliced to the running web W. The brush solenoid BS locks itself in, around contact PPR2 through normally open contact BS1 which is closed by energization of the brush solenoid. Additionally, the cutter solenoid KS is energized in response to energization of the brush solenoid BS since it is connected in parallel with the brush solenoid through a normally open brush solenoid BS. The cutter solenoid then operates to drive the cutter blade or knife 36 into engagement with the web running from the expiring roll 11A causing the web to be severed so that now only the web from the new roll 11B is transmitted to the press.

At this time, a final position relay FPR is energized since it is connected between the supply lines L1 and L2 through the normally open contact KS2 of the cutter solenoid KS which is now closed since the cutter solenoid is energized and through a normally open contact RMR1 of a reel mercury relay RMR (not shown) associated with the reel arm holding the new roll 11B, the reel mercury relay RMR being so positioned on the reel arm associated with the new roll 11B that the reel mercury relay is energized and contact RMR1 is closed when the new roll 11B is positioned adjacent the running web B. Additionally, when the cutter solenoid KS is energized, the predrive solenoid PDS is deenergized since the normally closed contact of the cutter solenoid KS1 associated therewith is opened. Accordingly, the advance carriage solenoid ACS is deenergized and the return carriage solenoid RCS is energized so that the operation of the carriage position motor CPM is reversed and the carriage 31 is returned to the "stowed" position causing the limit switch 2CLS to be opened and the limit switch 1CLS to be closed. The brush solenoid and the cutter solenoid are both deenergized when the limit switch 2CLS is opened. The final position relay FPR is not affected by deenergization of the outer solenoid KS since it locks itself around the cutter solenoid contact KS2 through its own contact FPR1.

The position reel relay PRR is again energized when the limit switch 1CLS is closed since it is also connected between the supply lines L1 and L2 through the limit switch 1CLS and through the normally open contact FPR2 of the final position relay FPR which is now closed. As a result, the reel motor controller RMC and the reel motor RM are again rendered operative so that the spider assembly 14 is again rotated. When the new roll 11B has attained the desired position, i.e., the position shown in FIG. 1 for the expiring roll 11A, the reel mercury relay RMR is deenergized so that the final position relay FPR and the position reel relay PRR are deenergized. Thus, the control circuit illustrated in FIG. 14 is conditioned for another splicing operation when the new roll 11B has expired such that another new roll must now be spliced to the running web W.

*Modified control pulse producing means*

In accordance with another aspect of the invention, the control pulse producing means illustrated in block form in FIG. 2 by elements 46, 48, 49, 50 and 52 may be modified so that fewer elements are required. More specifically, a zone magnetizable disc may be provided for causing a control pulse to be produced. Referring to FIG. 15, a zone magnetizable disc 250 is illustrated which has a "print head" 251, a "read head" 252 and an "erase head" 253 associated therewith.

In operation, the disc 250 is associated with the running web W and is geared so that it rotates at a speed proportional to the press speed. During each revolution thereof, a current pulse is applied to the "print head" which causes a magnetic bar to be printed. As the bar passes the "read head," a voltage pulse will be induced therein which corresponds to the control pulse produced by the counter 52. The control pulse is likewise transmitted to the pulse shaper and reset circuit 55. The reference pulse is produced at brush 41C when it engages contact portion 40C, and the time period between the production of the reference pulse and the production of the control pulse corresponds to the passage of a prescribed length of web W to the press. Accordingly, the disc arrangement may be substituted for the gear 49, a magnetic pickup 48, pulse shaper-integrator-inverter circuit 50, gate 46 and counter 52. Since the details of the controlling operation for the disc arrangement correspond to those for the counter arrangement, the details will not be set forth, but rather reference may be had to the above description with the counter arrangement.

It will be apparent that the time period between the reference pulse and the control pulse may be varied by varying the relative positions of the "print head" 251 and the "read head" 252. Additionally, for the purpose of erasing the magnetic bar after the production of a control pulse, a permanent magnet ("erase head") 253 is associated with the disc 250, the field created thereby opposing the polarity of the magnetic bar and thus neutralizing the disc as the bar passes thereby.

*Generic description of control system and alternative embodiments*

Figure 15A:
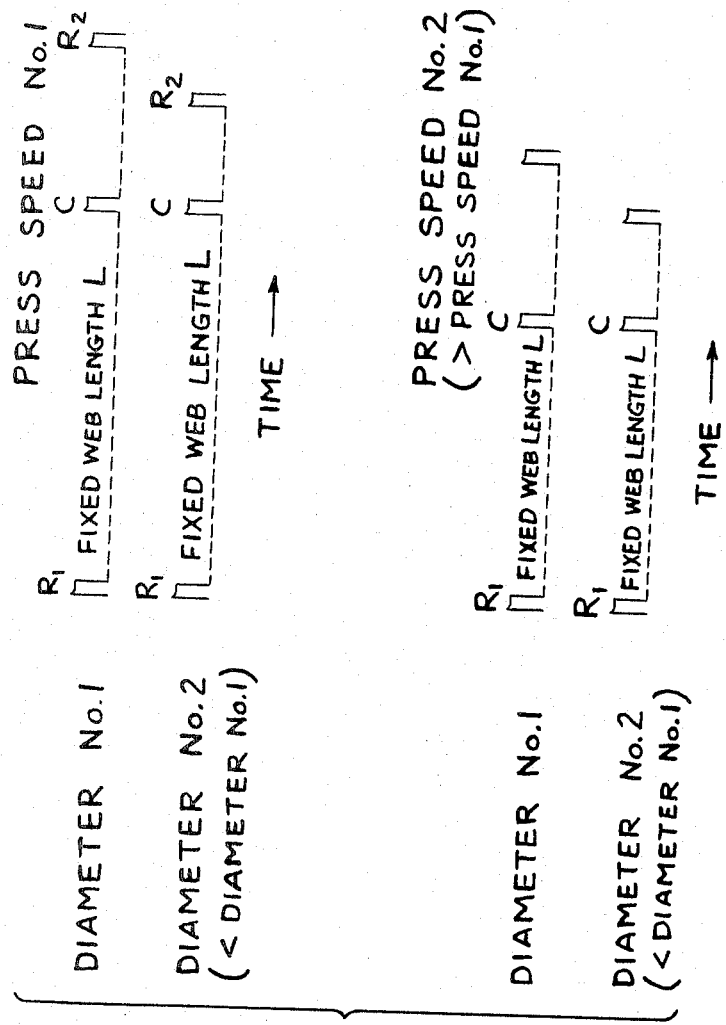
FIG. 15a is a diagram illustrating the variation in the time relationship of the reference pulses and control pulses as a function of both the press speed and the diameter of the expiring roll.

The particular control system which has been described in detail above represents one example of how the teachings of the present invention may be followed to provide a pulse generating means for producing a pair of pulses during each revolution of the expiring roll, with the time relationship between the pulses varying as a function of the expiring roll diameter and the speed of the running web, and sensing means operatively connected to the pulse generating means for producing a first output pulse in response to a first prescribed time relationship between the pulses to initiate the preliminary operations, and for producing a second output pulse in response to a second prescribed time relationship between the pulses to initiate the splicing operation. It will be recognized that other systems may be devised to perform the same functions in accordance with this invention. In this connection, the diagram in FIGURE 15a may facilitate an understanding of the generic features of the invention as described above. Thus, FIGURE 15a illustrates how the time relationship between the reference and control pulses varies as a function of the expiring roll diameter and the speed of the running web. Each pulse labeled R represents a reference pulse and each pulse labeled C represents a control pulse. The top half of FIGURE 15a shows that for a given press speed No. 1 the time between successive reference pulses gradually decreases in accordance with decreases in the expiring roll diameter. Consequently, the time period between the successive reference pulses R for diameter No. 1 is greater than the time period between successive reference pulses R for the smaller expiring roll diameter No. 2. Since each control pulse is produced in response to the passage of a fixed length of web L the time period between the first reference pulse R and the control pulse C remains the same as long as the press speed is held constant so that for press speed No. 1, the time between R1 and C is the same for both diameter No. 1 and diameter No. 2. However, since the time between successive reference pulses R1 and R2 decreases from diameter No. 1 to diameter No. 2, the time period between each control pulse C and the second reference pulse R2 also decreases. That is, the time period between control pulse C and the second reference pulse R2 gradually decreases as a function of the diminishing expiring roll diameter.

Turning to the lower half of FIGURE 15a, the relative positions of the reference pulses R1 and R2 and the control pulse C are similar to those described above for the first press speed No. 1. However, since the press speed No. 2 illustrated in the lower half of FIGURE 15a is greater than the press speed No. 1, the time period between successive reference pulses is shorter. Also, although a control pulse C is still being produced in response to the same fixed web length L, the time period between the first reference pulse R1 and the control pulse C is shorter because the web is running at a higher speed. Thus, it is clear that the time relationship between the reference pulses and the control pulse varies as a function of the web speed as well as a function of the expiring roll diameter.

As will be readily recognized by those skilled in the art, a number of different digital control systems could be devised to achieve the desired pulse patterns described above. The inventive system provides a high degree of precision to insure the reliable splicing operations, and yet there is no need for continual calibration as in the case of splicing control systems in the prior art. Moreover, the digital control system provided by this invention achieves considerably better resolution so that the rolled diameters, for example, are measured with a high degree of accuracy which could not be attained in any previous splicing control system.

As examples of how the illustrative control system described above might be modified and still perform the functions essential to this invention, instead of stretching the control pulse, the desired preliminary operation control signal can be produced either (1) by delaying the start of the counter by a fixed time interval corresponding to the preset time interval of the stretched pulse, or (2) by delaying the timing of the triggering pulse. Specific circuitry embodying the first alternative, i.e., for delaying the start of the counter by a fixed time interval corresponding to the preset time period of the aforedescribed stretched pulse, is illustrated in FIGURES 16–19.

In FIGURES 16–19, portions of the circuit which are similar to corresponding portions of the circuit already described in FIGURES 9–12 have been assigned the same reference numerals used in FIGURES 9–12. The pulse shaper circuit 81, the differentiator 82, the inverter circuit 83, and the gate 46 shown in FIGURE 16 are identical to those shown in FIGURE 9, and a description of the operation of these portions of the circuit will not be repeated here. The circuit of FIGURE 16 differs in that the open gate input 87 is connected to a transistor 300 so that when a ground triggering signal is provided at the open gate input terminal 87, in response to rotation of the commutator 40, the transistor 300 is rendered non-conductive since its base is connected to the input terminal 87. When transistor 300 is rendered non-conductive, the potential at the collector thereof rises so that the next transistor 301 is rendered conductive. As transistor 301 is rendered conductive, it sets a bistable multi-vibrator or flip-flop 302 which includes a pair of gating transistors 303 and 304. The collectors of the transistors 303, 304 are respectively connected to a positive source of potential B+ through resistors 305 and 306, the emitters are connected to ground through a diode 307, and the bases are respectively connected to the collector of the other transistor through resistors 308 and 309.

In this particular embodiment, the carriage limit switch 1CLS is a normally open switch, and whenever this switch is open the setting of the flip-flop 302 begins the charging of a capacitor 310 through a variable resistor 311. When the charge on the capacitor 310 has attained a prescribed level, a unijunction transistor 312 is rendered conductive and the capacitor 310 is permitted to discharge so as to reset the flip-flop 302. The time required for the capacitor 310 to charge to the prescribed level which causes the unijunction transistor to be rendered conductive is preset at a desired level by presetting the variable resistor 311. As the flip-flop 302 is reset by the discharging of the capacitor 310, it renders a transistor 313 conductive since the base thereof is resistance coupled to the collector of transistor 303. As the transistor 313 is rendered conductive, it causes the potential at the collector of transistor 88 to rise so that transistor 89 is rendered conductive and the gate 46 is opened. As described above in connection with FIGURE 9, when the gate 46 is open a negative going ground output pulse is provided at the output terminal 127 of the inverter circuit 83 for each cycle of the sine wave provided by the magnetic pickup device 48, and these output pulses are transmitted to the counter 52 so as to begin the counting process. Thus, it can be seen that the circuit modifications in FIGURE 16 have the effect of delaying the start of the counting operation by a fixed time interval corresponding to the time period of the stretched pulse described above in connection with FIGURES 9–12.

The circuits illustrated in FIGURES 18 and 19 are identical to the previously described circuits of FIGURES 11 and 12 except that the pulse stretcher circuit 58 has been deleted from the circuitry shown in FIGURE 18 because it is replaced by the counting delay circuitry described above in connection with FIGURE 16. Accordingly, the operation of the circuits shown in FIGURES 18 and 19 will be similar to the operation of the corresponding portions of the circuits of FIGURES 11 and 12 described above and need not be repeated at this point.

When the switch 1CLS is closed in response to the "first firing" as the carriage 31 is moved to the operative position, it effectively removes the counter delay circuit from the system. Consequently, the delay circuit can not be actuated, and the trailing edge of the "start count" commutator pulse sets the flip-flop comprising gate 46 via transistors 300, 301, and 313. This opens the gate 46, and the counting begins again for the second firing.

It will be readily apparent that alternative circuitry can be devised for delaying the timing of the triggering pulse in order to achieve the desired pattern of reference pulses and control pulses. It would also be possible to delay the timing of the control pulse for the desired interval, which would have the same net result as stretching the control pulse as done in the circuit of FIGURES 9–12.

In view of the foregoing, it may be seen that a paster control system has been provided for automatically initiating preliminary operations and final splicing operations in sequence and in properly timed relation to the gradually diminishing diameter of an expiring roll for the particular speed of the running web.

I claim as my invention:

1. In apparatus for splicing the web from a new roll to a running web drawn from an expiring roll wherein first components are provided for effecting preliminary operations to make ready for splicing and second components are provided for effecting the splicing operation, the combination which comprises pulse generating means for producing a pair of pulses during each revolution of the expiring roll, the time relationship between said pulses varying as a function of the expiring roll diameter and the speed of the running web, and sensing means operatively connected to said pulse generating means and responsive to prescribed time relationship between said pulses for producing an output signal to initiate the preliminary operations by the first components.

2. The apparatus of claim 1 in which said sensing means produces a first output pulse in response to a first prescribed time relationship between said pulses to initiate the preliminary operations by the first components and produces a second output pulse in response to a second prescribed time relationship between said pulses to initiate the splicing operation by said second components.

3. In apparatus for splicing the web from a new roll to a running web drawn from an expiring roll wherein first components are provided for effecting preliminary operations to make ready for splicing and second components are provided for effecting the splicing operation, the combination which comprises first pulse generating means for producing a reference pulse during a portion of each revolution of the roll, second pulse generating means for producing a control pulse during a portion of each revolution of the roll in response to the passage of a prescribed length of web so that the time relationship between the reference pulses and the control pulses varies as a function of the expiring roll diameter and the speed of the running web, and sensing means operatively connected to said first and second pulse generating means for producing an output pulse for initiating the preliminary operations by the first components in response to a prescribed time relationship between said reference pulses and said control pulses.

4. The apparatus of claim 3 in which said sensing means produces a first output pulse in response to a first prescribed time relationship between said reference pulses and said control pulses to initiate the preliminary operations by the first components, and produces a second output pulse in response to a second prescribed time relationship between said reference pulses and said control pulses to initiate the splicing operation by the second components.

5. In apparatus for splicing the web from a new roll to a running web drawn from an expiring roll wherein components are provided for effecting the splicing operation, the combination which comprises, means associated with the running web for producing a train of timing pulses at a rate dependent upon the speed of the running web, means associated with the expiring roll for producing a reference pulse during a portion of each revolution thereof, an adjustable counter having an input terminal, an output terminal, and a reset terminal for producing a control pulse at said output terminal when a predetermined number of timing pulses have been counted, a gate interposed between the means for producing the timing pulses and the input terminal of the counter, means responsive to the reference pulse for opening the gate so that the train of timing pulses is transmitted to the input terminal of the counter, means responsive to the control pulse from the counter for closing the gate and for resetting the counter, and coincidence sensing means responsive to portions of the reference pulse and the control pulse timingly overlapping for actuating the splicing components.

6. In apparatus for splicing the web from a running web drawn at different running velocities from an expiring roll into a web-processing device to an adjacent rotating new roll which has adhesive on the leading edge of the web thereof, the combination which comprises, means for deflecting the running web against the surface of the new roll, means responsive to the actuation of the deflecting means for severing the web drawn from the expiring roll, means associated with the running web for producing timing pulses at a rate dependent upon the speed of the running web, means associated with the expiring roll for producing a reference pulse during a portion of each revolution thereof, an adjustable counter for counting the timing pulses when rendered operative and for producing a control pulse when a preset number of timing pulses have been counted, means for rendering the counter operative timingly adjacent the trailing edge of the reference pulse, and coincidence sensing means responsive to portions of the reference pulse and the control pulse timingly overlapping for actuating the deflecting means.

7. The apparatus of claim 6 in which the duration of the reference pulse changes with changes in the rotational rate of the roll.

8. In apparatus for splicing the web from a new roll to a running web drawn from an expiring roll wherein first components are provided for effecting preliminary operations to make ready for splicing and second components are provided for effecting the splicing operation, the combination which comprises, means associated with the running web for producing timing pulses at a rate dependent upon the speed of the running web, means associated with the expiring roll for producing a reference pulse during a portion of each revolution thereof, an adjustable counter rendered operative in response to the trailing edge of the reference pulse for counting the timing pulses and for producing a control pulse when a preset number of timing pulses have been counted, means responsive to a control pulse for producing a conditioning pulse having a preset time period, and coincidence sensing means responsive to portions of the reference pulse and the conditioning pulse timingly overlapping for initiating the preliminary operations by the first components and for rendering the conditioning pulse producing means ineffective until the splicing operation has been completed, the coincidence sensing means subsequently being responsive to portions of the reference pulse and the control pulse timingly overlapping for initiating the splicing operation by the second components.

9. The apparatus of claim 8 wherein said means for producing timing pulses comprises a cylindrical device having a plurality of projections formed around the circumference thereof which is associated with the running web and is rotated at a speed dependent upon the speed of the running web, and means positioned adjacent the cylindrical device for producing a timing pulse in response to the passage of each projection.

10. The apparatus of claim 8 wherein said means positioned adjacent the cylindrical device for producing timing pulses is a magnetic pick up device.

11. In apparatus for splicing the web from a new roll to a running web drawn from an expiring roll wherein first components are provided for effecting preliminary operations to make ready for splicing and second components are provided for effecting the splicing operation, the combination which comprises, means associated with the running web for producing timing pulses at a rate dependent upon the speed of the running web, second means associated with the expiring roll for producing a reference pulse during a portion of each revolution thereof, an adjustable counter for counting the timing pulses produced when rendered operative and for producing a control pulse when a preset number of timing pulses have been counted thereby, means operative timingly adjacent the trailing edge of each reference pulse for rendering the counter operative, means responsive to a control pulse for producing a conditioning pulse having a preset time period, means responsive to a control pulse for resetting the counter to an initial condition, and coincidence sensing means responsive to portions of the reference pulse and the conditioning pulse timingly overlapping for initiating the preliminary operations by the first components and for rendering the conditioning pulse producing means ineffective until the splicing operation has been completed, the coincidence sensing means subsequently being responsive to portions of the reference pulse and the control pulse timingly overlapping for initiating the splicing operation by the second components.

12. In apparatus for splicing the web from a new roll to a running web drawn from an expiring roll wherein first components are provided for effecting preliminary operations to make ready for splicing and second components are provided for effecting the splicing operation, the combination which comprises, means associated with the running web for producing timing pulses at a rate dependent upon the speed of the running web, a commutator and a source of potential so associated with the expiring roll that during a prescribed portion of each revolution thereof a reference pulse is produced, an adjustable counter for counting the timing pulses produced when rendered operative and for producing a control pulse when a preset number of timing pulses have been counted thereby, means operative timingly adjacent the trailing edge of each reference pulse for rendering the counter operative, means responsive to a control pulse for producing a conditioning pulse having a preset time period, means responsive to a control pulse for resetting the counter to its initial condition, and coincidence sensing means responsive to portions of the reference pulse and the conditioning pulse timingly overlapping for initiating the preliminary operations by the first components and for rendering the conditioning pulse producing means ineffective until the splicing operation has been completed, the coincidence sensing means subsequently being responsive to portions of the reference pulse and the control pulse timingly overlapping for initiating the splicing operation by the second components.

13. In apparatus for splicing the web from a new roll to a running web drawn from an expiring roll wherein first components are provided for effecting preliminary operations to make ready for splicing and second components are provided for effecting the splicing operation, the combination which comprises, means associated with the running web for producing timing pulses at a rate dependent upon the speed of the running deb, means associated with the expiring roll for producing a reference pulse during a portion of each revolution thereof, an adjustable binary counter rendered operative timingly adjacent the trailing edge of the reference pulse for counting the timing pulses and having a plurality of outputs whereat control pulses are produced when preset numbers of timing pulses have been counted thereby, means responsive to a control pulse when associated with a binary counter output for producing a conditioning pulse having a preset time period, coincidence sensing means responsive to portions of the reference pulse and the conditioning pulse timingly overlapping for initiating the preliminary operations by the first components and for rendering the conditioning pulse produced means ineffective until the splicing operation has been completed, the coincidence sensing means subsequently being responsive to the reference pulse and the control pulse timingly overlapping when associated with a binary counter output for initiating the splicing operation by the second components, and means for associating the conditioning pulse producing means and the splicing operation initiating means with a selected binary counter output.

14. In apparatus for splicing the web from a running web drawn from an expiring roll to a new roll wherein first components are provided for effecting preliminary operations to make ready for splicing and second components are provided for effecting the splicing operation, the combination which comprises, means associated with the running web for producing timing pulses at a rate dependent upon the speed of the running web, means associated with the expiring roll for producing a reference pulse during a portion of each revolution thereof, an adjustable counter rendered operative timingly adjacent the trailing edge of the reference pulse for counting the timing pulses and for producing a control pulse when a preset number of timing pulses have been counted, a pulse stretching means including a unijunction transistor responsive to a control pulse for producing a conditioning pulse having a preset time period, means responsive to a control pulse for resetting the counter to an initial condition, and coincidence sensing means responsive to portions of the reference pulse and the conditioning pulse timingly overlapping for initiating the preliminary operations by the first components and for rendering the conditioning pulse produced means ineffective until the splicing operation has been completed, the coincidence sensing means subsequently being responsive to portions of the reference pulse and the control pulse timingly overlapping for initiating the splicing operation by the second components.

15. In apparatus for effecting the sticking adhesive on the leading end of the web of a new roll to a running web drawn from an expiring roll, the combination which comprises, means for predriving the new roll, means for deflecting the running web against the new roll and severing the running web, means for positioning the new roll adjacent the running web, means for positioning the predrive means in contact with the new roll, means for positioning the deflecting and severing means adjacent the running web, means associated with the running web for producing timing pulses at a rate dependent upon the speed of the running web, means associated with the expiring roll for producing a reference pulse during a portion of each revolution thereof, and adjustable counter rendered operative in response to the trailing edge of the reference pulse for counting the timing pulses and for producing a control pulse when a preset number of timing pulses have been counted, means responsive to a control pulse for producing a conditioning pulse having a preset time period, and coincidence sensing means responsive to portions of the reference pulse and the conditioning pulse timingly overlapping for actuating the three positioning means and the predriving means and for rendering the conditioning pulse producing means ineffective until the splicing operation has been completed, the coincidence sensing means subsequently being responsive to portions of the reference pulse and the control pulse timingly overlapping for actuating the deflecting and severing means.

16. In apparatus for splicing the web from a new roll to a running web drawn from an expiring roll wherein first components are provided for effecting preliminary operations to make ready for splicing and second components are provided for effecting the splicing operation, the combination which comprises, means associated with the running web and effective during a portion of each revolution of the expiring roll for producing a control pulse representing the utilization of a prescribed length of web from the expiring roll, means associated with the expiring roll for producing a reference pulse during a portion of each revolution thereof which has a prescribed time period, means responsive to a control pulse for producing a conditioning pulse having a preset time period, and coincidence sensing means responsive to portions of the reference pulse and the conditioning pulse timingly overlapping for initiating the preliminary operations by the first components and for rendering the conditioning pulse producing means ineffective until the splicing operation has been completed, the coincidence sensing means subsequently being responsive to portions of the reference pulse and the control pulse timingly overlapping for initiating the splicing operation by the second components.

17. In apparatus for splicing the web from a new roll to a running web drawn from an expiring roll wherein first components are provided for effecting preliminary operations to make ready for splicing and second components are provided for effecting the splicing operation, the combination which comprises, a zone magnetizable disc which is associated with the running web and is rotated at a speed relative to the speed of the running web, means positioned adjacent the disc for reading in a magnetic bar in the disc during each revolution thereof, means positioned adjacent the disc for producing a control pulse in response to the passage of a magnetic bar which represents the passage of a prescribed length of web, means positioned adjacent the disc for erasing each magnetic bar subsequent to the production of the control pulse, means associated with the expiring roll for producing a reference pulse during a portion of each revolution thereof which has a prescribed time period, means responsive to a control pulse for producing a conditioning pulse having a preset time period, and coincidence sensing means responsive to portions of the reference pulse and the conditioning pulse timingly overlapping for initiating the preliminary operations by the first components and for rendering the conditioning pulse producing means ineffective until the splicing operation has been completed, the coincidence sensing means subsequently being responsive to portions of the reference pulse and the control pulse timingly overlapping for initiating the splicing operation by the second components.

18. In a system for monitoring the diameter of a rotating roll upon which or from which a web is being wound or unwound, the combination which comprises, means associated with the web and effective during a portion of each roll revolution for responding to the passage thereof to produce output pulses each indicative of the passage of a prescribed length of web, a counter for counting the output pulses and for providing a control pulse when a prescribed number of output pulses have been counted thereby, means associated with the roll for producing a reference pulse during a portion of each revolution thereof, and coincidence sensing means responsive to portions of the control pulse and the reference pulse timingly overlapping for providing an output indicating that the roll diameter has attained a desired value.

19. In a system for monitoring the diameter of a rotating roll upon which or from which a web is being wound or unwound, the combination which comprises, means associated with the web and responsive to the passage thereof for producing a control pulse during a portion of each revolution of the roll which represents the passage of a prescribed length of web, means associated with the roll for producing a reference pulse during a portion of each revolution thereof, and coincidence sensing means responsive to a prescribed timed relationship between the control pulse and the reference pulse for providing an output indicating that the roll diameter has attained a desired value.

References Cited by the Examiner

UNITED STATES PATENTS

| 2,939,646 | 6/1960 | Stone | 242—58.2 |
| 3,015,454 | 1/1962 | Flannery et al. | 242—58.2 |

FRANK J. COHEN, *Primary Examiner.*

L. D. CHRISTIAN, *Assistant Examiner.*